United States Patent [19]

Laflamme

[11] 4,412,473
[45] Nov. 1, 1983

[54] CALCULATOR FOR GUITAR CHORDS

[75] Inventor: Daniel C. Laflamme, Vancouver, Canada

[73] Assignee: D C L Microelectronics, Inc., Vancouver, Canada

[21] Appl. No.: 251,950

[22] Filed: Apr. 7, 1981

[51] Int. Cl.³ ............................................. G09B 15/00
[52] U.S. Cl. ................................ 84/485 R; 84/470 R; 340/711
[58] Field of Search ..................... 84/470 R, 477, 478, 84/485

[56] References Cited

U.S. PATENT DOCUMENTS

| | | | |
|---|---|---|---|
| 4,054,868 | 10/1977 | Rose | 84/470 R |
| 4,080,867 | 3/1978 | Ratanangsu | 84/477 R |
| 4,257,306 | 3/1981 | Laflamme | 84/485 R |
| 4,286,495 | 9/1981 | Roof | 84/477 R |
| 4,295,406 | 10/1981 | Smith | 84/470 R |
| 4,318,327 | 3/1982 | Toups | 84/477 R |
| 4,344,344 | 8/1982 | Nakada et al. | 84/478 X |

*Primary Examiner*—David L. Trafton
*Attorney, Agent, or Firm*—Berman, Aisenberg & Platt

[57] ABSTRACT

An electronic device in the nature of a hand-held calculator, for illustrating on the display area required string and fret positions of a fretted stringed instrument to be fingered to play the notes making up a particular chord. The device comprises a series of manually operable basic chord information buttons and a visual representation of the strings of the fretted instrument and of the frets over a particular range is also provided. A ROM means is programmed with chord table information relating chords in desired keys with related fret and string finger position information. A microprocessor means is electronically associated with the chord information switches, open string position indicator LED's, first fret reference LED's, fret and string finger position LED's stores information concerning the particular chord information buttons and upon being actuated, the microprocessor searches the ROM means for fret and finger position information corresponding to the chord information button or buttons actuated, and displays that information by way of illuminating means in the appropriate areas of the fret and string representation. Such a device adopts logic technology to store and reproduce in a display area information as selected concerning the strings and fret positions to be fingered for any selected predetermined chord on a fretted stringed instrument through the application of an appropriate logic system.

8 Claims, 18 Drawing Figures

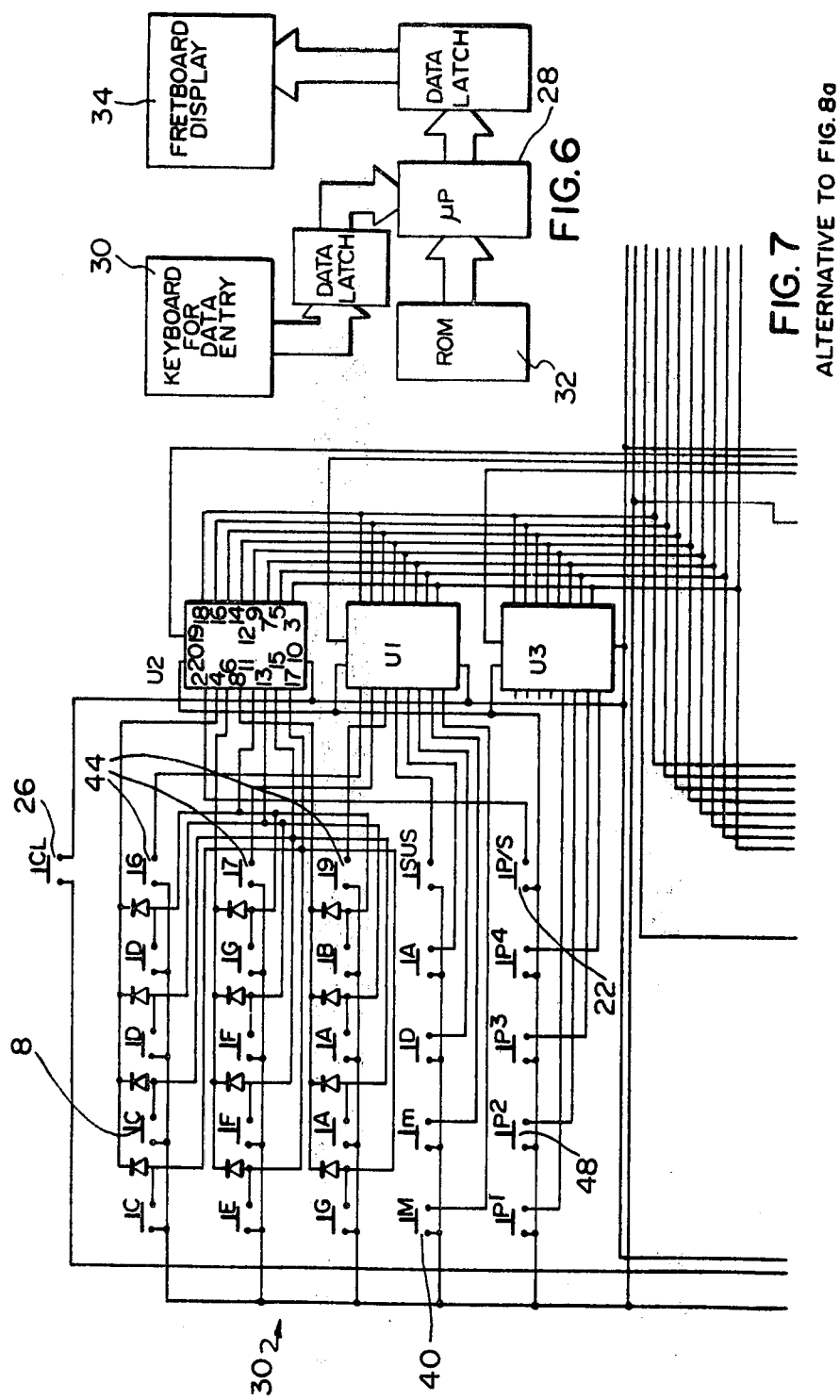

CALCULATOR FOR GUITAR CHORDS

BACKGROUND OF THE INVENTION

This invention relates to an electronic device, in the nature of a hand held calculator, for displaying in sequence intervals of chords for various keys for a fretted stringed instrument. More particularly, the invention relates to an electronic device which uses a logic system for storing, and then displaying as selected, the finger positions for the strings of a fretted stringed instrument represented by a selected chord or selected series of musical intervals in a selected key. Variations of the device permit sequential displaying of alternative finger positions for a particular chord, sequential display of different types of chords (e.g. major, minor, diminished, augmented, etc.) once a particular key has been selected, and sequential display of a particular type of chord in different keys.

Of background interest is my co-pending U.S. application Ser. No. 871,173 filed Jan. 23rd, 1978 for "Electronic Display Device for Fretted Stringed Instruments". That application relates to an electro-mechanical system for displaying in a display area the finger positions for the strings of a fretted stringed instrument represented by a selected key and a selected series of musical intervals. What appears in the string and fret display is predetermined by the co-selection of related key and musical interval switches and does not require the use of any logic system other than in an associated numeric display used to identify the bar position fret for a selected chord. That device does not provide for chords having "open" strings, i.e. chords in which not all of the strings of the instrument are played, and is limited in the number of chords which can be displayed, since essentially a separate circuitry must be provided for each desired chord in each desired key.

Other references of background interest describing and illustrating display devices for stringed musical instruments having some electronic features include Johnson, Jr., et al U.S. Pat. No. 3,978,757 issued Sept. 7th, 1976, Weitzner U.S. Pat. No. 3,403,591 issued Oct. 1st, 1968 and Weitzner U.S. Pat. No. 3,379,087 issued Apr. 23rd, 1968.

SUMMARY OF THE INVENTION

In accordance with the present invention, an electronic device in the nature of a hand held calculator is provided for illustrating on the display area required string and fret positions of a fretted stringed instrument to be fingered to play the notes making up a particular chord. The device comprises a series of manually operable basic chord information buttons. Each button is associated with a corresponding chord information switch with one chord information switch for each chord or musical interval for which finger position information is desired. A visual representation of the strings of the fretted instrument and of the frets over a particular range is also provided. Electronically actuated fret and string finger position indicator means are associated with the fret and string representation, each of the string finger positions for each of the frets having electronically actuable indicator means associated with it. Electronically actuated open string position indicator means are associated with each string of the fret and string representation to indicate when a corresponding string is not fingered. An electronically actuated first fret reference indicator means to represent a fret reference point for a selected chord is provided. A ROM means is programmed with chord table information relating chords in desired keys with related fret and string finger position information. Microprocessor means is electronically associated with the chord information switches, open string position indicator means, first fret reference indicator means and fret and string finger position indicator means. The microprocessor is adapted to store information concerning the particular chord information switch or switches actuated until there is actuation of a manually operable select means associated with a select switch means. The microprocessor then searches the ROM for fret and finger position information corresponding to the chord information switch or switches actuated, and displays that information on the appropriate fret and string finger position indicator means, open string position means and first fret reference indicator means. A manually operable switch means is electronically associated with the microprocessor and fret and string finger position indicator means to clear information displayed on the fret and string representation as required. The device according to this invention provides an accurate visible indication on the fret and string representation, of the string and fret positions to be fingered for any selected predetermined chord. Such a device adopts logic technology to store and produce in a display area information as selected concerning chords in any key or a fretted stringed instrument through the application of an appropriate logic system.

In one embodiment of this invention, each basic chord information button and corresponding chord information switch represents a particular key in the chromatic scale and is independently and not simultaneously actuable with respect to other chord information switches and corresponding chord information switches. A series of chord indicator buttons and corresponding chord indicator switches are provided representing types of chords, with the chord indicator switches being electronically associated with the microprocessor and each not being simultaneously actuable with each other but simultaneously actuable with the chord information switches. The microprocessor is also adapted to store information regarding the particular chord indicator switch actuated until the select switch means is actuated. The microprocessor then searches the ROM for fret and finger position information corresponding to the chord information and chord indicator switches which are actuated, and displays that information on the appropriate fret and string finger position indicator means, open string position indicator means and first fret reference indicator means.

In another embodiment according to the present invention, each basic chord information button and associated switch represents a different musical interval. Each such basic chord information button and switch is simultaneously actuable with other such buttons and switches. A selection button and associated switch is provided so that, after actuation of the desired basic chord information switches, actuation of the selection switch causes the function of predetermined basic chord information buttons and switches to be converted to that of representing the keys in the chromatic scale. Each such switch, functioning in this key representing capacity, is not simultaneously actuable with other such similarly functioning switches. These chord information switches functioning as key selection switches simultaneously act as select switch means.

A series of chord alternative position indicator buttons and corresponding chord alternative position indicator switches may be further provided to the device of the present invention to show alternative chord positions for a particular chord on the fret and string finger position indicator means and fret and string representation. The chord alternative position switches are electronically associated with the microprocessor and are each simultaneously actuable with the chord information switches, but independently and not simultaneously actuable with other chord alternative position indicator switches. The ROM means is programmed with chord table information relating to alternative chord positions for chords and keys with related alternative fret and string finger position information. The microprocessor is also adapted to store information concerning the particular chord alternative position indicator switch which is actuated, until such time as the select switch is actuated, and then search the ROM for fret and string finger position information corresponding to the particular chord information switch and chord alternative position indicator switch actuated. That information is then displayed on the appropriate fret and string position indicator means, open string position indicator means and first fret reference indicator means.

The device according to the present invention permits storage and reproduction on the visual representation of the device of a considerable volume of chording information (e.g. 1500 to 2000 different chords) for a guitar or similar stringed instrument. The device can be used by students or professional musicians alike for purposes of learning the appearance and location of chords on a stringed intrument and for a fast, easy identification of desired chords when composing or playing music.

BRIEF DESCRIPTION OF THE DRAWINGS

Other objects and advantages of the present invention will become apparent upon reading the following detailed description and upon referring to the drawings in which:

FIG. 6 is a schematic block diagram of the logic and display features of the electronic device according to the present invention;

FIG. 7 is a circuit diagram of a portion of the circuitry of the embodiment of FIG. 1 according to the present invention;

Similar features have been given similar reference numerals in the drawings.

While the invention will be described in connection with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

Figure 1:
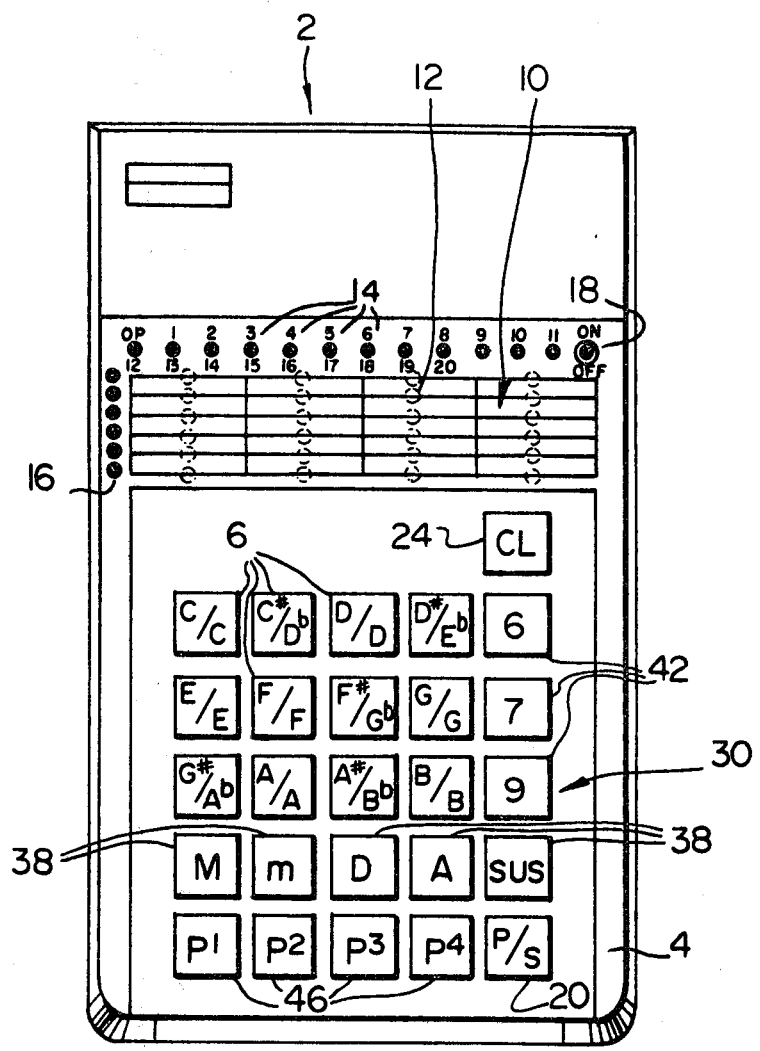
FIGS. 1 to 5 are plan views of the faces of example embodiments of electronic devices according to the present invention.
Figure 2:
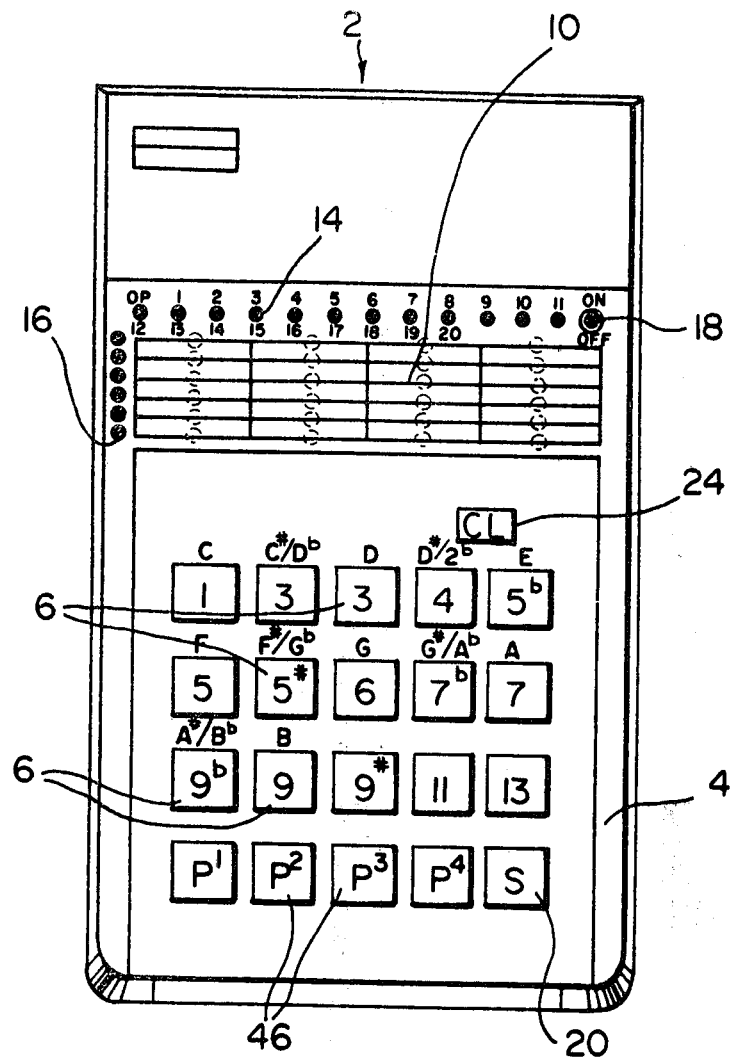

Turning first to FIGS. 1 to 5, there are shown example embodiments of electronic devices 2 according to the present invention. Each device has a frame 4 on which are mounted a series of manually operated basic chord information buttons 6, each such button being associated with a corresponding chord information switch 8 (FIG. 7 or 8a), one such chord information button and chord information switch being provided for each key in respect of which finger position information is desired (FIGS. 1, 3, 4 and 5) or for each musical interval in respect of which such finger position information is desired (FIG. 2). A visual representation 10 of the frets and six strings of the fretted stringed instrument over a range of four frets, is provided. It is preferably transparent except for lines thereon representing frets and strings of the instrument. Towards the top of the device 2 as can be seen in FIGS. 1, 2 and 8c and 8d, electronically actuated fret and string finger position indicator means 12, being LEDs, are associated with the fret and string visual representation, each of the string finger positions for each of the frets having one such LED associated with it. Above fret and string visual representation 10 are situated a row of fret indicator LEDs 14, the function of which is to indicate on which frets a particular chord displayed on visual representation 10, of the frets along the neck of the stringed instrument that chord is to be played. In the embodiments illustrated, this is done by taking as a reference point the left hand fret of visual representation 10, and identifying that fret on the neck of the stringed instrument by the number of the fret indicator LED actuated for that particular illustrated chord.

Also in FIGS. 1 to 5 to the left of visual fret and string representation 10 appears a row of open string indicator LEDs 16, each situated beside a corresponding representation of a string in string and fret representation 10. Illumination of one or more of such LEDs indicate that the corresponding string or strings are to remain open (i.e. played but without fingering) for that particular displayed chord.

Above visual fret and string representation 10 also appears an on/off indicator LED 18, the LED to be illuminated when the device is on and operational.

A manually operated select button 20 is provided on the face of the devices, and associated with select switch 22 (FIGS. 7 and 8a), the function and operation of which will be detailed subsequently herein.

The clear button 24 and associated switch 26 (FIGS. 7 and 8a) provided, the function of which button and switch is to erase undesired intervals or chords which have been called up by operation of chord information buttons 6 and switches 8.

Turning to the block diagram of FIG. 6, it can be seen that device 2 is provided with a microprocessor 28, which is fed information from keyboard 30, which keyboard includes chord information buttons 6, select button 20 and clear button 24. A read only memory means 32 (ROM) is also provided within the device, programmed with chord table information relating chords in desired keys with related fret and string finger position information. The microprocessor means is electronically associated with the chord information switches 8, fret indicator LED 14, open string position indicator LEDs 16 and fret and string finger position LEDs 12 and is adapted to store information regarding the particular chord information switch or switches actuated and, as required, then search the ROM for fret and finger position information corresponding to the chord information switch or switches actuated. That information is then displayed through illumination of the appropriate fret and string position indicator LEDs 12, fret indicator LEDs 14, and open string position indicator LEDs 16 in fret board display area 34. In this manner an accurate, visible indication is given in the fret board display area 34 of the strings and fret positions to be fingered for any selected predetermined chord.

Considering the differences between the embodiments illustrated in FIGS. 1 to 5, FIG. 1 illustrates a chord displaying device in which the chord information buttons 6 function strictly as the buttons which represent particular keys of the chromatic scale, these buttons being independently and not simultaneously actuable. A further series of buttons 38, being chord indicator buttons, and associated switches 40 (FIG. 7) are provided, the function of which buttons and switches is to relate a chord type (e.g. minor, major, diminished, dominant, augmented or suspended) to the selected key, such that when select button 20 is actuated, the fret and finger position information corresponding to the selected key and chord type is displayed in the fret and string representation 10. It will be understood that chord indicator switches 40 are each independently and not simultaneously actuable with other chord indicator switches.

Interval buttons 42, representing 6, 7 and 9 intervals, as well as associated switches 44 (FIG. 7) are also provided to further increase the chord characterization and identification possible with this device. Again the interval switches 44 are independently and not simultaneously actuable with each other, although each is simultaneously actuable with chord indicator switches 40 and chord information switches 8. Thus, if the location of a major 7 chord in the key of E is sought, the appropriate chord information button 6 (for the key of E), chord indicator button 38 (showing "M") and interval button 42 (showing the numeral 7) would be selected and, as will be described in more detail subsequently, actuation of select button 20 then results in the appropriate chord location being displayed in fret and string representation 10 and by fret indicator means 14 and open string indicator LEDs 16.

Finally, in FIG. 1, alternative positions of a selected chord ($P^1$, $P^2$, $P^3$ and $P^4$) are displayable using chord alternative position indicator buttons 46, each associated with a chord alternative indicator switch 48 (FIG. 7). Chord alternative indicator switches 48 are each independently and not simultaneously actuable with other such switches 48.

The device of FIG. 2 is intended to be used by both musicians or non-musicians to gain a fundamental or basic knowledge of chord structure. While similar in overall appearance to the embodiment of FIG. 1, the device illustrated in FIG. 2 is provided with chord information buttons 6 and associated switches 8 (FIG. 8a) functioning as musical interval selector switches so that the operator may select the desired interval required to form a particular chord. The function of the buttons and corresponding switches of the first two rows and the first two buttons of the third row is altered, however, upon actuating select button 20. These buttons and corresponding switches then function as chord selector switches. In operation, the microprocessor 28 obtains from ROM 32 the combined information concerning the particular musical intervals selected and the particular key selected to cause illumination of the proper fret and finger position LEDs 12 for visual fret and string representation 10 for that particular chord. It will be understood that the chord information switches 8, when functioning as interval number selector switches, are simultaneously actuable with other chord information selector switches, but when functioning as chord selectors are not simultaneously actuable with similar switches. Alternative indicator buttons 46, and associated chord alternative indicator swtiches 48 (FIG. 8a) function as previously described in respect of the device of FIG. 1.

Figure 3:
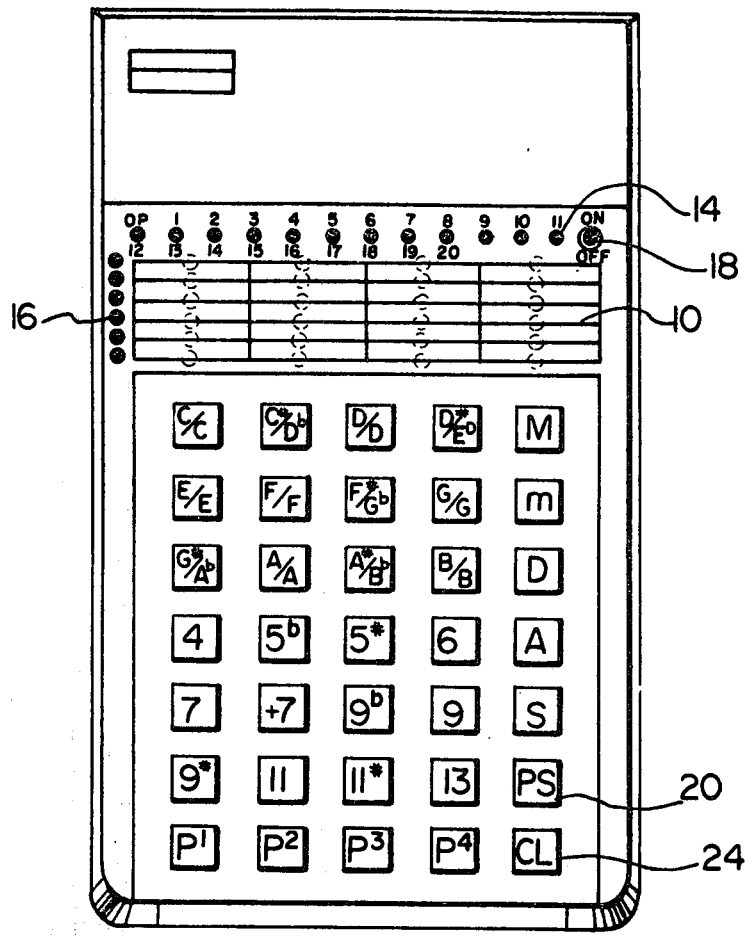
Figure 4:
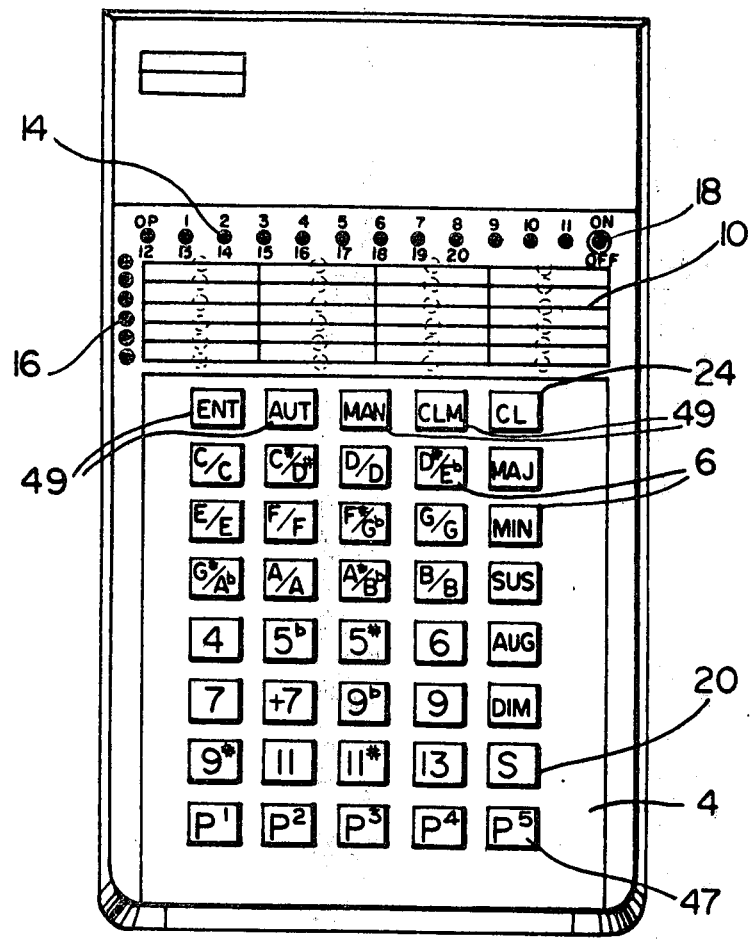

From the foregoing, the function of the buttons of the keyboards 30 of the devices of FIGS. 3 and 4 will be readily understood. In these embodiments, additional key buttons and associated switches are provided such that the buttons and switches do not share functions, as in the case of the device of FIG. 2. For instance, in FIG. 3, if a D major 7 chord is required, the "D/D", "MAJ", and "7" buttons are actuated, and upon actuation of the "S" selection button 20, an appropriate finger positioning to play that chord is illustrated in visual fret and string representation 10 by fret and finger position LEDs 12, fret indicator LEDs 14 and open string indicator LEDs 16. The unit of FIG. 4 is similar to that of FIG. 3 except that it is provided with an additional chord alternative indicator button 47 (and associated switch), to provide optional display of five basic alternative positions for a particular selected chord. As well, in the upper row of keyboard 30 thereof, buttons 49 and associated switches are provided to give additional versatility to the unit. This row of buttons, with associated switches and related circuitry modifications which will be readily understood by one skilled in the art, permits chords displayed to also be placed in a memory location (by actuating button "ENT"). That chord may be called back automatically ("AUT" button) or manually ("MAN" button). When the "AUT" button is pressed, such stored chords will reappear on the display at a time set by a rotary wheel, not shown in dictating seconds when first placed into memory. When the "MAN" button is pressed, the memory is activated by way of adaptors and an auxiliary switch means, so that the stored chord is called back and displayed. The "CLM" button and associated switch functions to clear the memory of such a chord.

Figure 5:
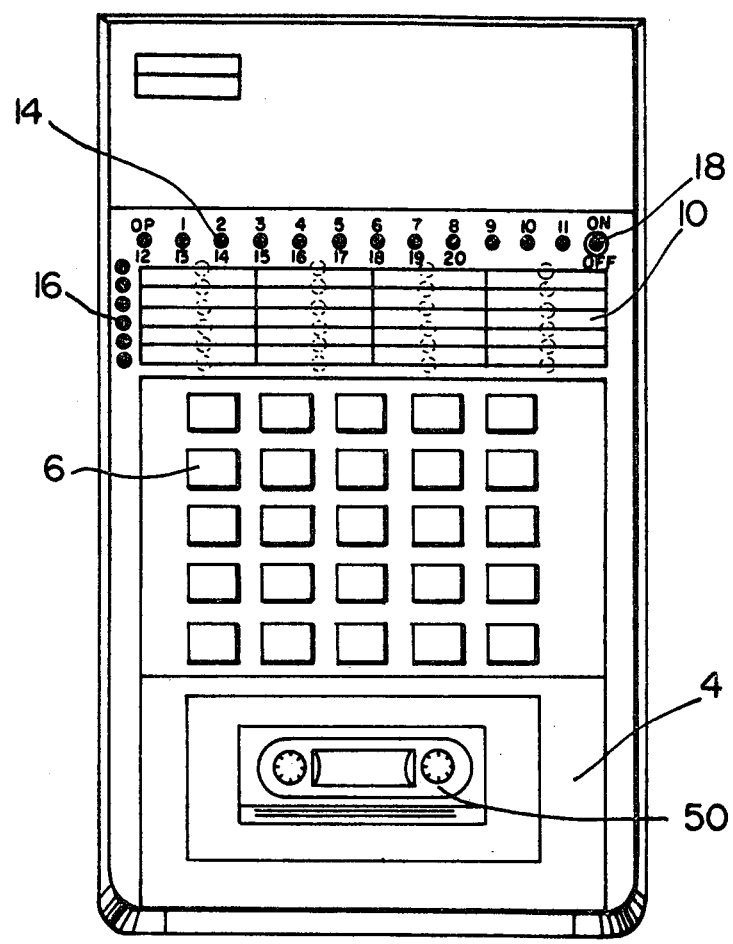

The device of FIG. 5 has a keyboard 30 set up generally similar to that of the unit of FIG. 1. Additionally however a tape recorder and playback means 50 is electronically associated with the unit to permit recording of characteristic signals received from the microprocessor relating to a sequence of selected chords, in such a manner that these signals may be subsequently played back to the microprocessor to cause to be illustrated on visual fret and string representation 10 an identical sequence of chord finger positions.

GENERAL DESCRIPTION OF CIRCUIT DIAGRAM

Referring to FIGS. 8a, 8b, 8c and 8d, it will be seen that this circuit diagram shows the entire circuitry and logic system that transforms signals entered through keyboard 30 into accurate visual LED representations at fret and string display 10, of chords thereby selected.

The circuit diagram of these Figures is representative of the circuitry and logic system of the unit illustrated in FIG. 2.

Figure 8A:
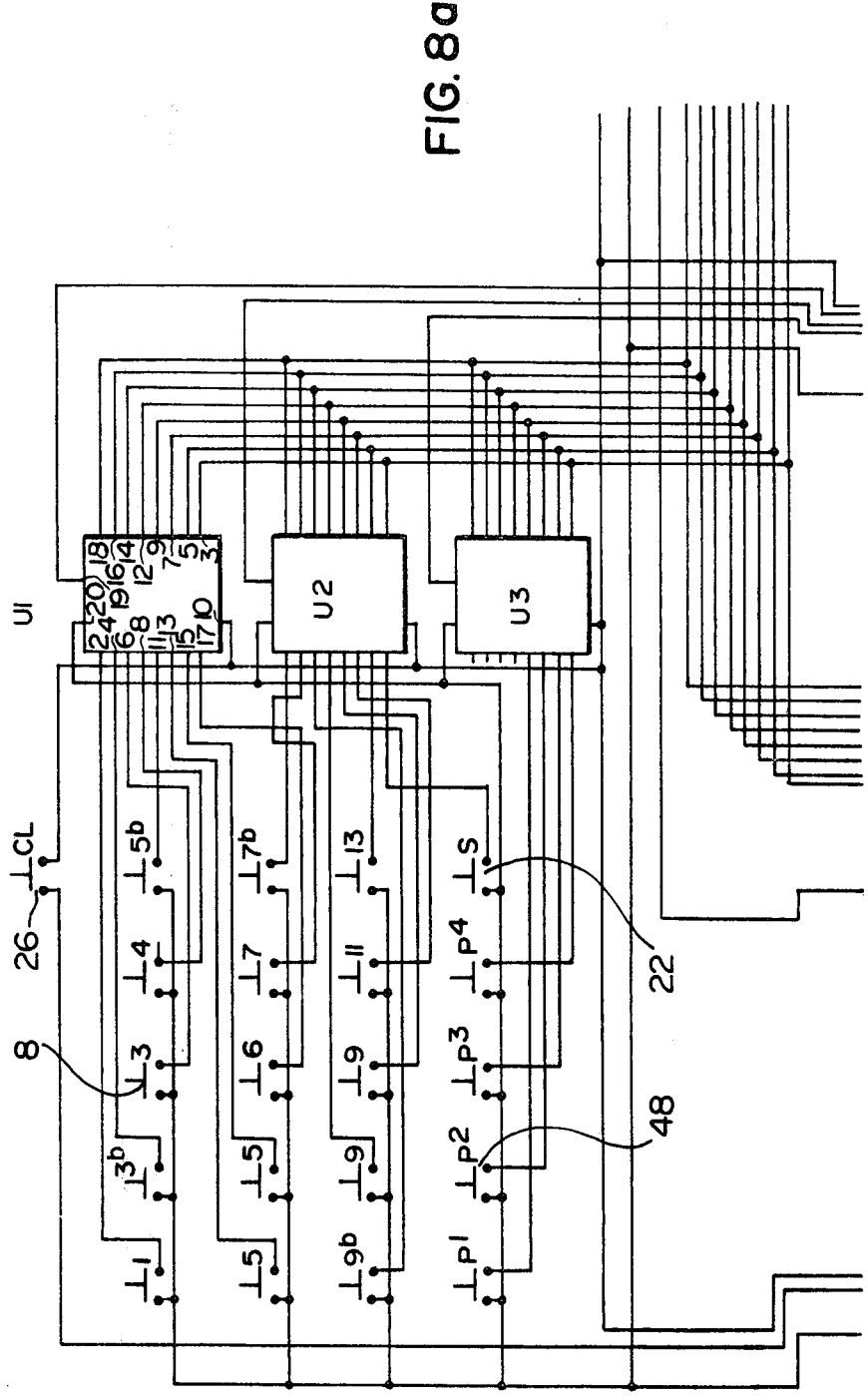
FIGS. 8a, 8b, 8c and 8d, arranged as illustrated at FIG. 8e, show a circuit diagram of the example embodiment of FIG. 2.
Figure 8B:
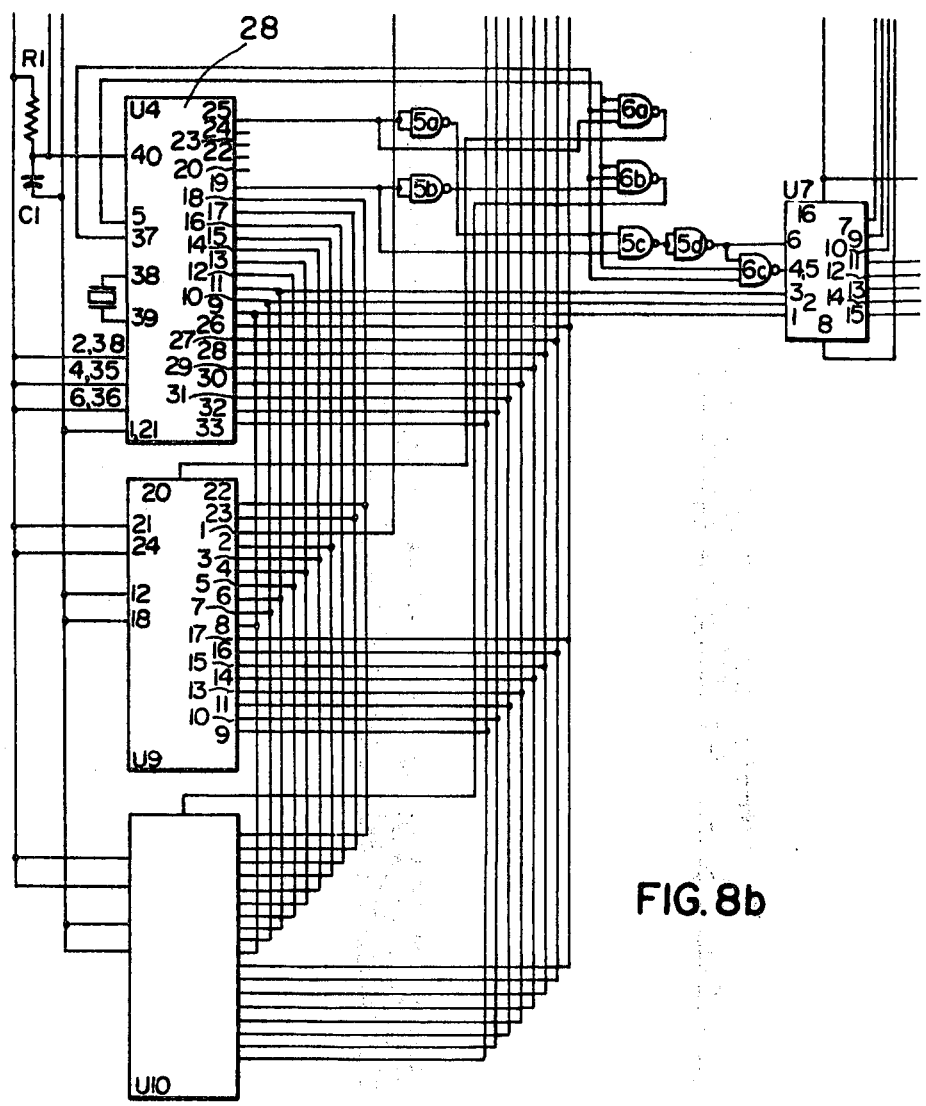
Figure 8E:
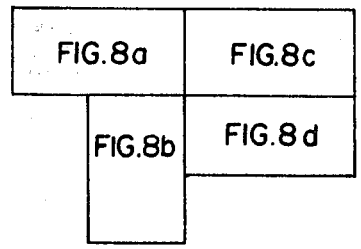
Figure 8C:
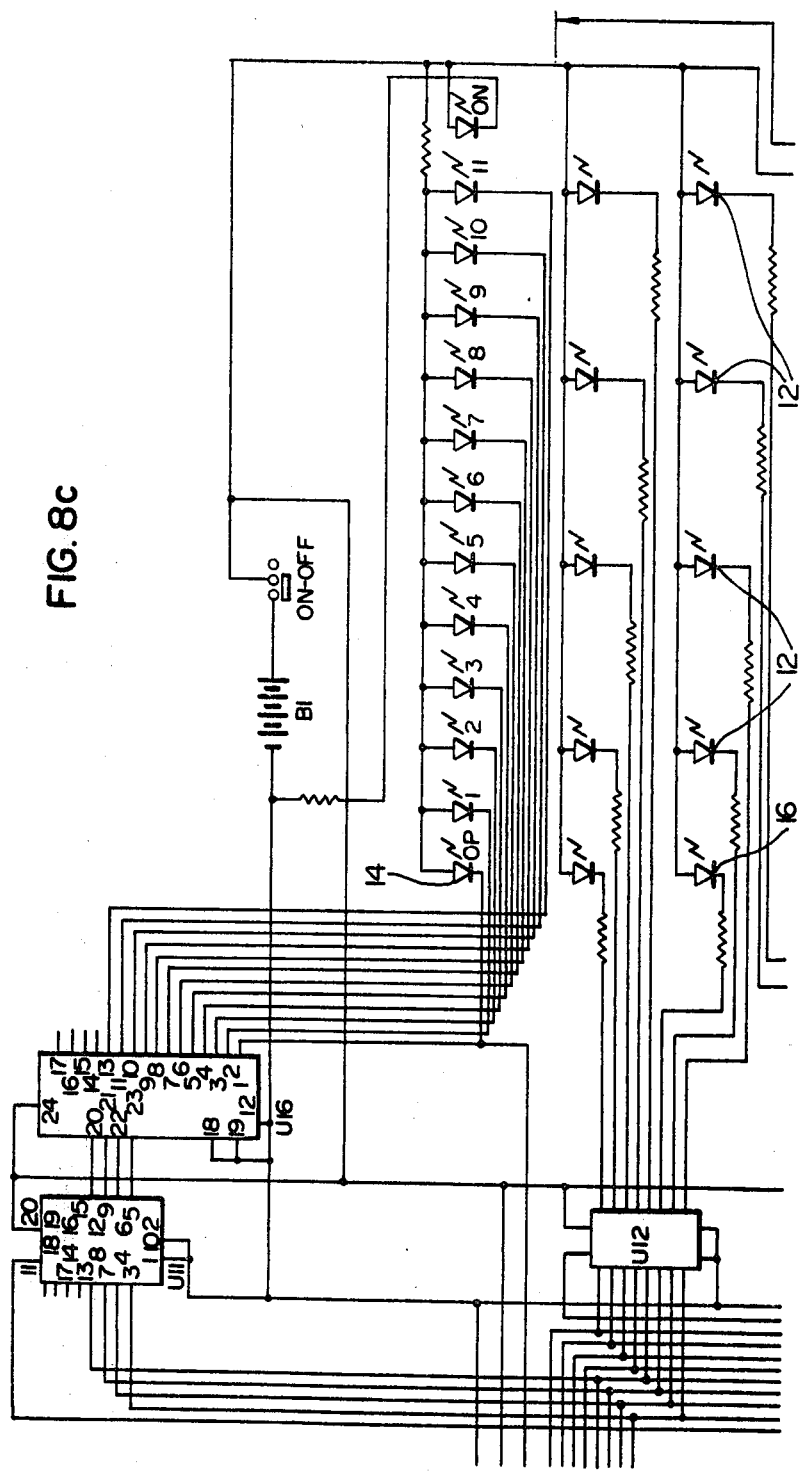
Figure 8D:
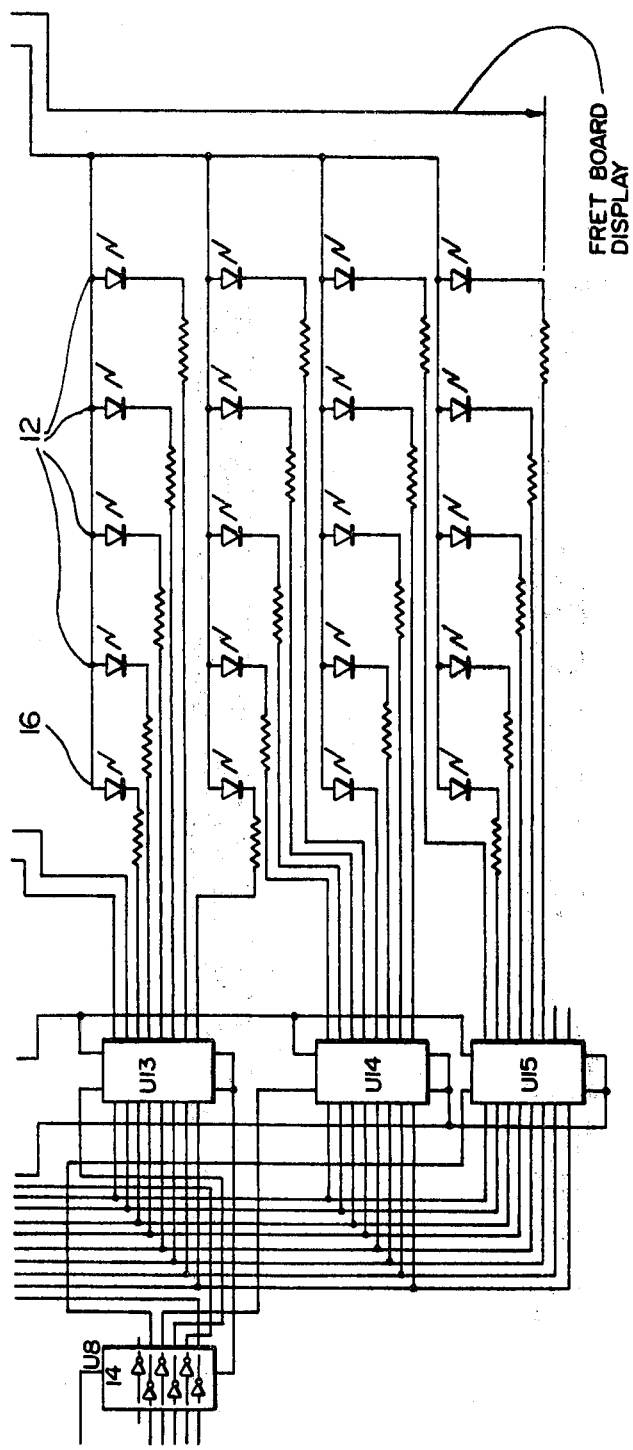

U1, U2 and U3 shown in FIG. 8a represent octal buffers with tri-state outputs to isolate switches from the data bus. These may be, for example Motorola 74LS241. Microprocessor 28 (for example Motorola 6802) is represented by U4 (FIG. 8b). 5a, 5b, 5c and 5d, and 6a, 6b and 6c represent nand gates (for example Motorola 74LS00 and 74LS10) (FIG. 8b), and U7 and U8 represent a 1 of 8 decoder (e.g. Motorola 74LS138) and a hex inverter (for example Motorola 74LS04) for address decoding and enabling of periphal I.C.'s. U9 and U10 represent 1,024×8 bit ROMs for program storage and data tables. These may be, for example Motorola 2708's, U11, 12, 13, 14 and 15 represent octal latches (for example Motorola 74LS373) for latching data to be displayed by fret and string finger position LEDs 12. U16 is a 1 of 16 decoder (for example Motorola 74LS154) for fret indicator LEDs 14.

In operation, on power up condition, the reset vectors are looked up from the ROM 32 at FFFE and FFFF and the reset routine is started. This clears all RAM in the microprocessor 28 and initializes the registers.

At this point, microprocessor 28 enables each of the three octal buffers (at addresses ØFØ5, ØFØ6, ØFØ7) in turn (U1, 2, 3) and determines if any of the chord information buttons or keys are being pressed. The signals from these keys are stored in RAM locations (ØØØ5 and ØØØ6) until such time as the select button 20 is pressed. When the select button has been pressed, microprocessor 28 takes the chord combination from RAM, and compares it with the valid chord table in ROM 32. When the valid chord is located, it is assigned a number which is stored in another RAM location (ØØØ8).

At this time, a musical key and position are selected and this information is then also stored in RAM locations (ØØØA and ØØØ7 respectively). When all three variables are determined and valid, microprocessor 28 uses this information to look up in ROM 32 the "fret" number and display it using address ØFØØ and then the "finger positions" on fretboard at addresses ØFØ1-ØFØ4 inclusive. This information is stored in latches (U11, 12, 13, 14, 15) for continuous display.

Once data has been stored in the latches, the keyboard is continually scanned so that the "musical key" and fingering position can be changed for the selected chord.

When the "CL" button 24 is pressed, microprocessor 28 is forced into a reset condition and the whole process will start again and enable the user to define a new chord.

Figure 9A:
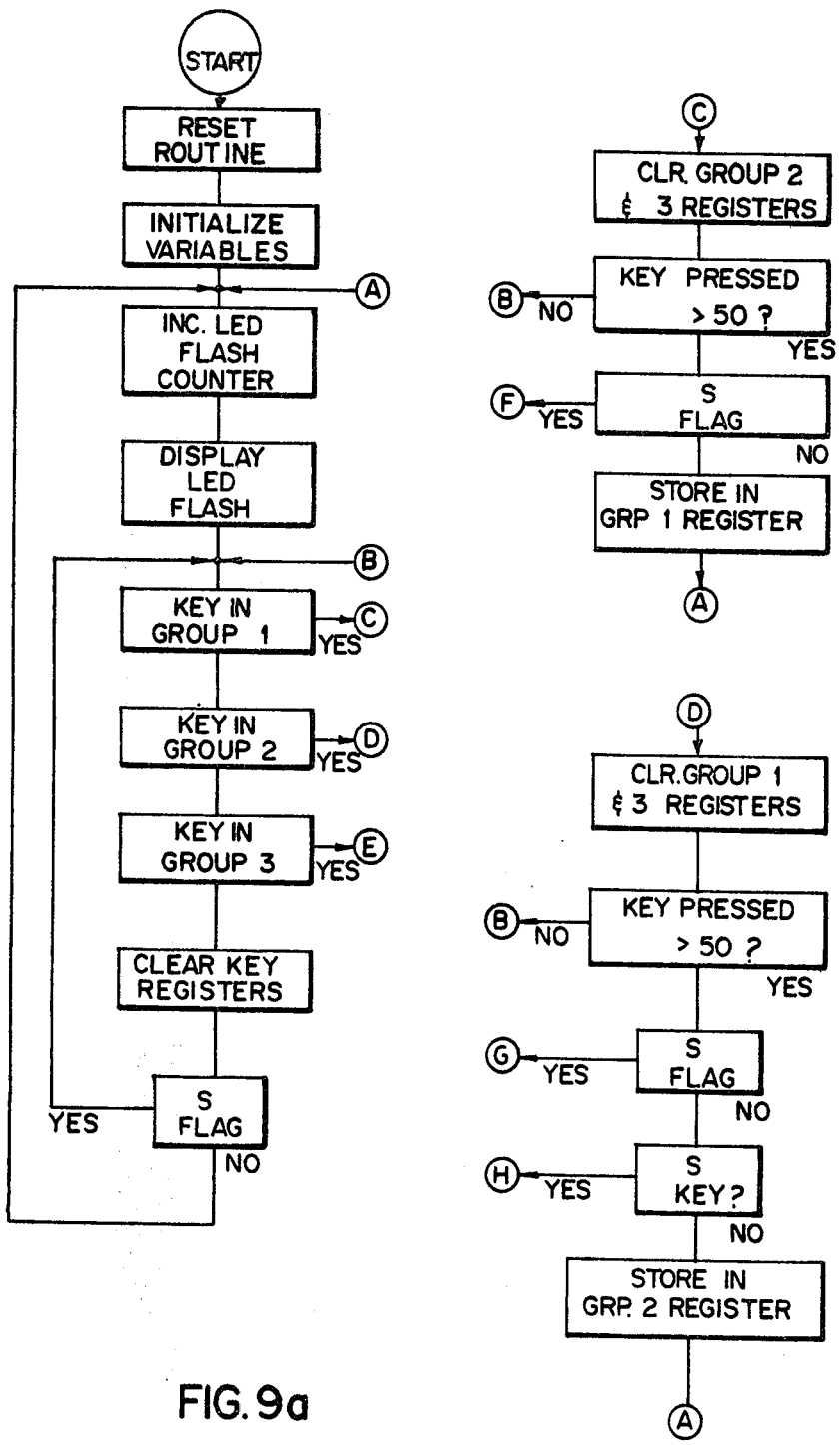
FIGS. 9a, 9b and 9c show a flow diagram of the operation of the logic system of the embodiment of FIG. 1 according to the present invention.
Figure 9:
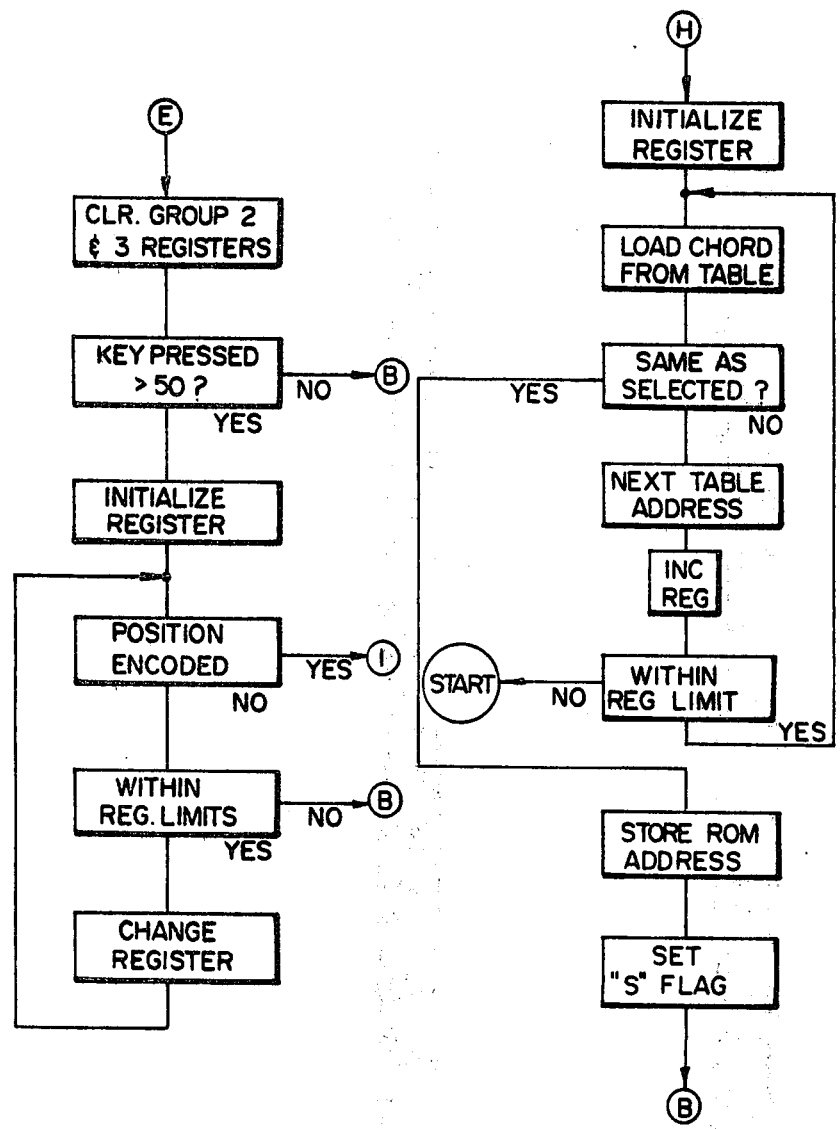
Figure 9C:
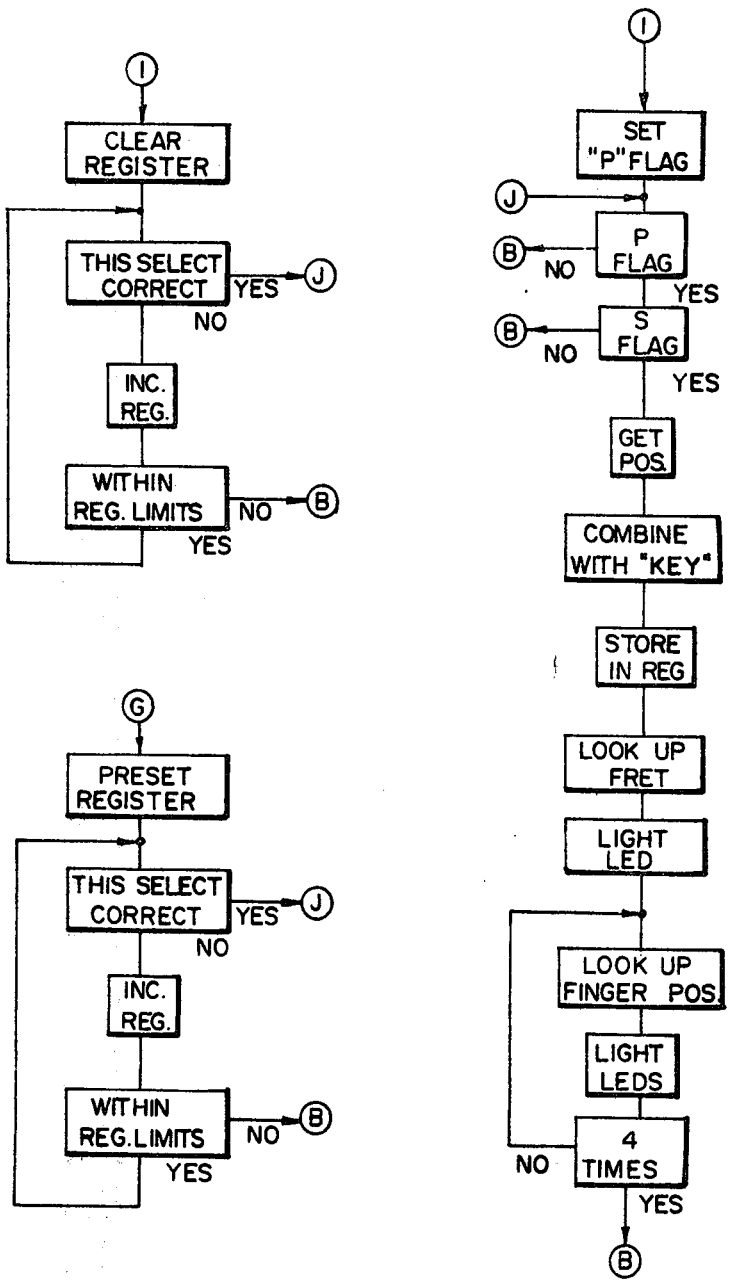

The flow diagrams of FIGS. 9a, 9b and 9c detail more specifically the stages of operation and of the logic system illustrated by the block diagram of FIG. 6 and circuitry of FIGS. 8a, 8b, 8c and 8d, for the device illustrated in FIG. 2.

Virtually identical circuitry is provided, for example, for the device of FIG. 1. The only modification to that circuitry is illustrated in FIG. 7 where it can be seen that chord information switches 8 serve only one function, i.e. to provide a direct chord access to the memory bank. The chord information switches 8 have only a single function and not, as in the device of FIG. 2, alternative functions. The operation of the circuitry and logic system of the device of FIG. 1 is very similar to that of the device of FIG. 2, with the exception that operation of the select switch 22, in the former, results in the retrieval of the necessary chord information from the ROM and display thereof on the appropriate LEDs in the fretboard display area 34, while the operation of select switch 22 in the case of the device of FIG. 2 simply changes the function of chord information switches 8 from interval selector to chord type selector.

Figure 10A:
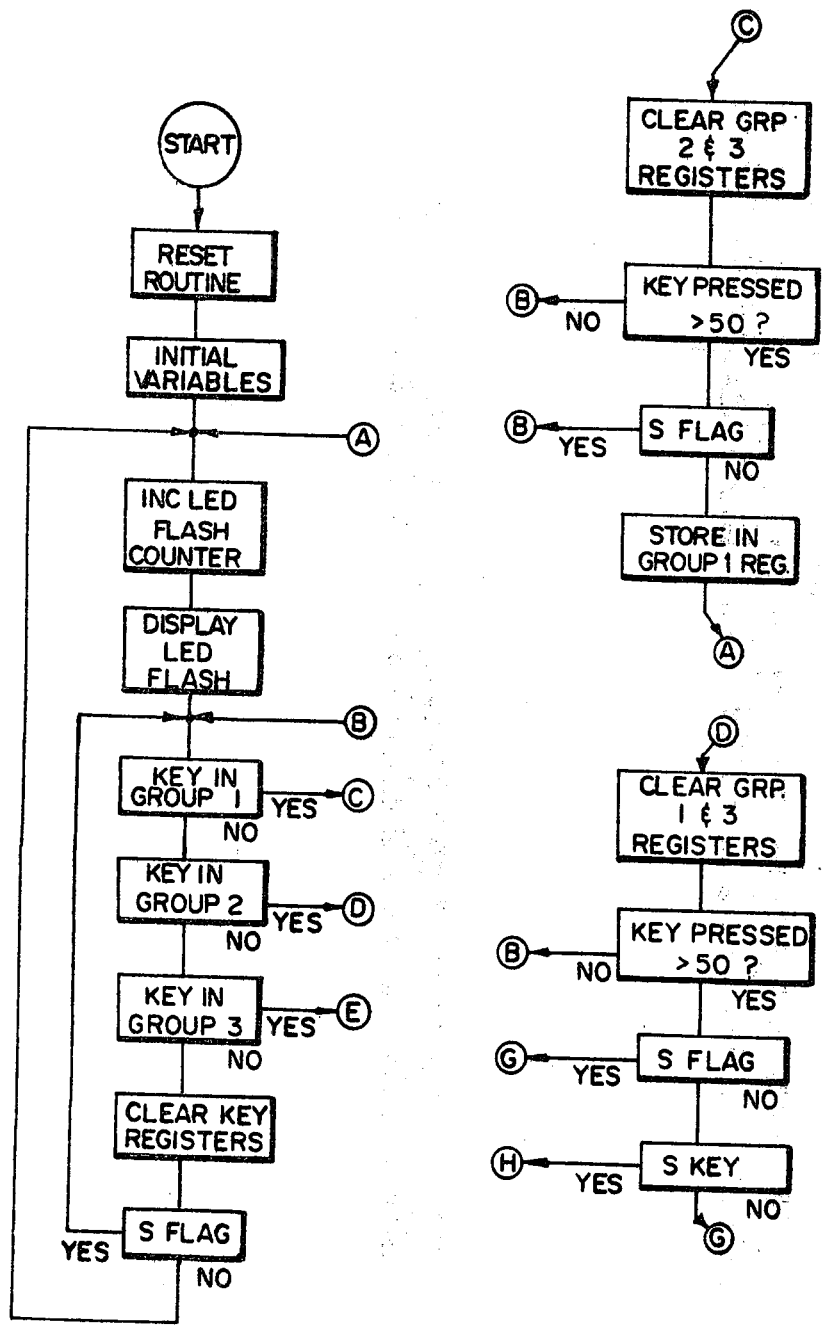
FIGS. 10a, 10b and 10c show a flow diagram of the operation of the logic system of the embodiment of FIG. 2 according to the present invention.
Figure 10:
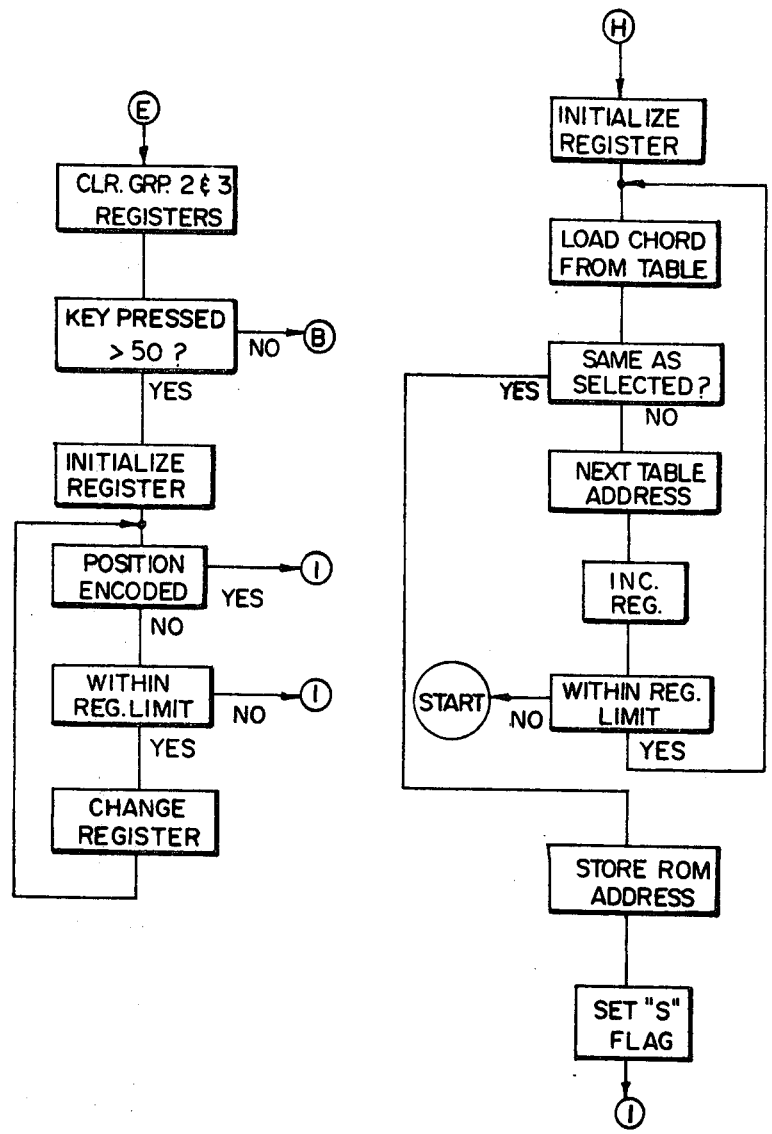
Figure 10C:
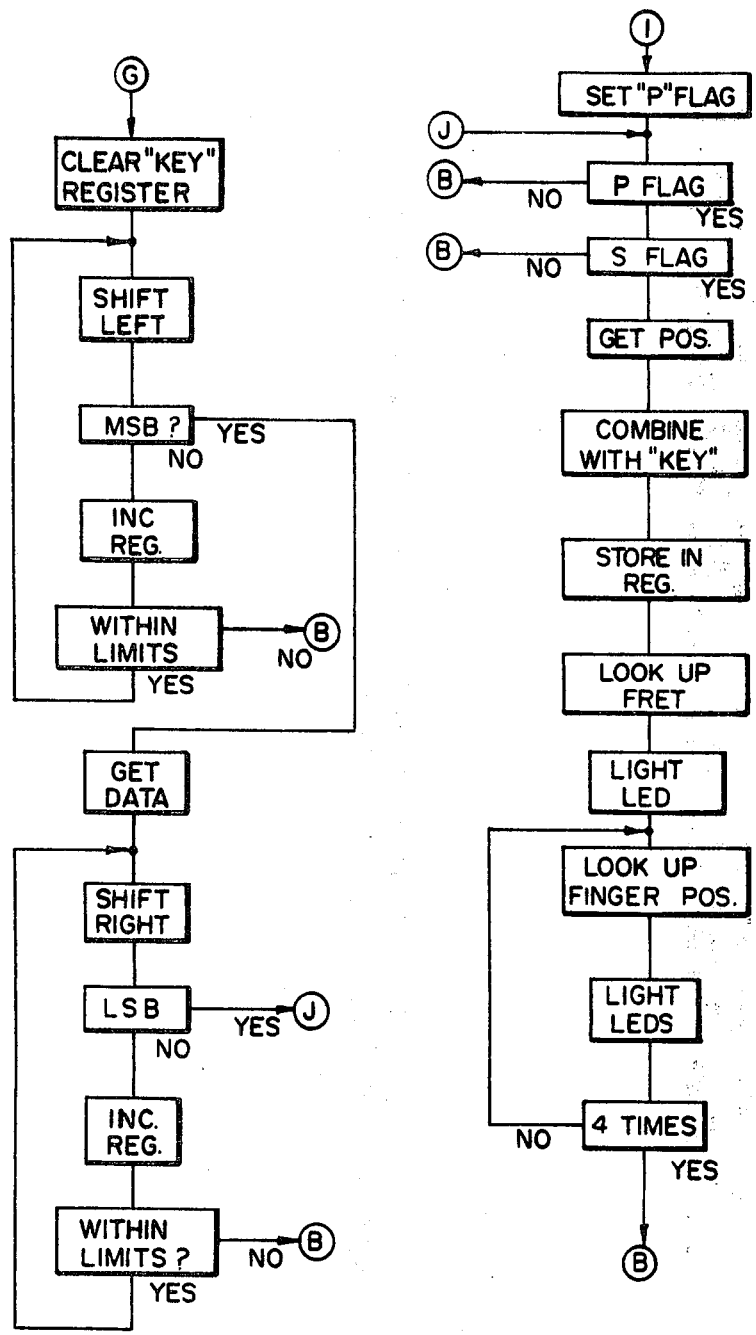

A flow diagram of the logic system of the device of FIG. 1 is illustrated in FIGS. 10a, 10b and 10c.

Summaries of the latch functions for the devices of FIGS. 1 and 2 are set out in the following table. It will be clear to one skilled in the art, from this information, the manner in which the logic and circuitry of the devices of FIGS. 3, 4 and 5 may be set up.

Schedule A is a machine language program of the operation of the device of FIGS. 1 and 7, while Schedule B is a machine language program of the operation of the device of FIGS. 2 and 8a, 8b, 8c and 8d.

Thus it is apparent that there has been provided in accordance with the invention an electronic device in the nature of a hand held calculator that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

| Schedule 'A' | |
|---|---|
| ØØØØ | Temporary LED Storage for flashing |
| ØØØ1 | Key Press Duration group 1 |
| ØØØ2 | Key Press Duration group 2 |
| ØØØ3 | Key Press Duration group 3 |
| ØØØ4 | "P/S" flag (is chord complete?) |
| ØØØ5 | Temporary chord Storage register |
| ØØØ6 | Not used |
| ØØØ7 | ROM Address for finger positions on frets |
| ØØØ8 | ROM Address for finger positions on frets |
| ØØØ9 | "P" flag (has position been selected?) |
| ØØØA | Temporary "KEY" Storage |
| ØØØB | ROM Address for fret selection |
| ØØØC | ROM Address for fret selection |
| ØFØØ | Fret Position Latch |
| ØFØ1 | Latches for finger positions |
| ØFØ2 | Latches for finger positions |
| ØFØ3 | Latches for finger positions |
| ØFØ4 | Latches for finger positions |
| ØFØ5 | T/S buffers for switches |
| ØFØ6 | T/S buffers for switches |
| ØFØ7 | T/S buffers for switches |
| Ø3AØ–Ø3BF | Valid chord look-up table |
| Ø3CØ–Ø3FF | Fret position ROM table |
| FCØØ–FFFD | Finger position ROM table |
| FFFE–FFFF | Reset Vector |

| Schedule 'A' Valid Chord Look up Table | |
|---|---|
| Ø3AØ | Ø1 |
| Ø3A1 | 81 |
| Ø3A2 | 41 |
| Ø3A3 | 21 |
| Ø3A4 | A1 |
| Ø3A5 | Ø2 |
| Ø3A6 | 82 |
| Ø3A7 | 42 |
| Ø3A8 | 22 |
| Ø3A9 | 4Ø |
| Ø3AA | 48 |
| Ø3AB | 2Ø |

Schedule 'A'
Valid Chord Look up Table

| | | |
|---|---|---|
| | Ø3AC | 28 |
| | Ø3AD | 44 |
| | Ø3AE | Ø8 |
| | Ø3AF | 5Ø |
| | Ø3B1 | XX |
| | Ø3B2 | XX |
| | Ø3B3 | XX |
| | Ø3B4 | XX |
| | Ø3B5 | XX |
| | Ø3B6 | XX |
| | Ø3B7 | XX |
| | Ø3B8 | XX |
| | Ø3B9 | XX |
| | Ø3BA | XX |
| | Ø3BB | XX |
| | Ø3BC | XX |
| | Ø3BD | XX |
| | Ø3BE | XX |
| | Ø3BF | XX |

Schedule 'A'
Reset Routine

| | | | |
|---|---|---|---|
| | LDA A | #$Ø3 | |
| | STA A | $ØB | |
| LED Flash | INC | $ØØØØ | |
| | LDA A | $ØØ | |
| | STA A | $ØFØØ | |
| Key Press | LDA A | $ØFØ5 | |
| | TST A | | |
| | BNE | Key Group 1 | |
| | LDA A | $ØFØ6 | |
| | TST A | | |
| | BNE | Key Group 2 | |
| | LDA A | $ØFØ7 | |
| | TST A | | |
| | BNE | Key Group 3 | |
| | CLR | $ØØØ1 | |
| | CLR | $ØØØ2 | |
| | CLR | $ØØØ3 | |
| | TST | $ØØØ4 | |
| | BNE | Key Press | P/S Flag |
| | JMP | LED Flash | |
| Key Group 1 | CLR | $ØØØ2 | |
| | CLR | $ØØØ3 | |
| | INC | $ØØØ1 | |
| | LDA B | #$32 | |
| | CMP B | $Ø1 | |
| | BNE | Key Press | |
| | TST | $ØØØ4 | |
| | BNE | Key Press | |
| | ORA A | $Ø5 | |
| | STA A | $Ø5 | |
| | JMP | LED Flash | |
| Key Group 2 | CLR | $ØØØ1 | |
| | CLR | $ØØØ3 | |
| | INC | $ØØØ2 | |
| | LDA B | #$32 | |
| | CMP B | $Ø2 | |
| | BNE | Key Press | |
| | TST | $ØØØ4 | P/S Flag |
| | BNE | "KEY" Key 1 | |
| | LSR A | | |
| | BCS | Chord Valid? | |
| | ROL A | | |
| | JMP | "KEY" Key 1 | |
| Key Group 3 | CLR | $ØØØ1 | |
| | CLR | $ØØØ2 | |
| | INC | $ØØØ3 | |
| | LDA B | #$32 | |
| | CMP B | $Ø3 | |
| | BNE | Key Press | |
| | LDA B | #$FC | |
| | STA B | $ØØØ7 | |
| | LDA B | #$Ø3 | |
| Pos Search | LSR A | | |
| | BCS | Display | |

Schedule 'A'
Reset Routine

| | | | |
|---|---|---|---|
| | INC | $ØØØ7 | |
| | DEC B | | |
| | BEQ | Display | |
| | JMP | Pos Search | |
| Chord Valid | CLR A | | |
| | LDX | #$Ø3AØ | |
| | LDA B, X | $ØØ | |
| | CMP B | $Ø5 | |
| | BEQ | Valid | |
| | INX | | |
| | INX | | |
| | ADD A | #$Ø4 | |
| | CMP A | #$54 | |
| | BEQ | Reset | (invalid chord) |
| | JMP | Test | |
| Valid | STA A | $Ø8 | |
| | LDA A | #$Ø1 | |
| | STA A | $Ø4 | Set P/S Flag |
| | JMP | Display + 1 | |
| "KEY" Key 1 | CLR | $ØØØA | |
| | LDX | #$ØØØ3 | |
| | TAB | | |
| | ASL B | | |
| Key Search 1 | INC | $ØØØA | |
| | ASL B | | |
| | BCS | "KEY" Key 2 | |
| | DEX | | |
| | BNE | Key Search 1 | |
| | JMP | Key Press | |
| "KEY" Key 2 | ASL | $ØØØA | |
| | ASL | $ØØØA | |
| | LDX | #$ØØØ4 | |
| | DEC | $ØØØA | |
| Key Search 2 | INC | $ØØØA | |
| | ASR A | | |
| | BCS | Display + Ø1 | |
| | DEX | | |
| | BNE | Key Search 2 | |
| | JMP | Key Press | |
| Display | LDA A | $Ø1 | |
| | STA A | $Ø9 | Set 'P' Flag |
| Display + 1 | TST | $ØØØ9 | |
| | BEQ | Key Press | |
| | TST | $ØØØ4 | |
| | BEQ | Key Press | |
| | LDA A | #$ØF | |
| | AND A | $Ø7 | |
| | ASL A | | |
| | ASL A | | |
| | ASL A | | |
| | ASL A | | |
| | ORA A | $ØA | |
| | STA A | $ØC | |
| | LDX | $ØB | |
| | LDA A, X | ØØ | |
| | STA A | $ØFØØ | |
| | LDX | $Ø7 | |
| | LDA A, X | ØØ | |
| | STA A | $ØFØ1 | |
| | LDA A, X | Ø1 | |
| | STA A | $ØFØ2 | |
| | LDA A, X | Ø2 | |
| | STA A | $ØFØ3 | |
| | LDA A, X | Ø3 | |
| | STA A | $ØFØ4 | |
| | JMP | Key Press | |

Schedule 'A'
Fret Position ROM Table

Position 1

| | | |
|---|---|---|
| Ø3C4 | ØØ | C |
| Ø3C5 | Ø1 | C# |
| Ø3C6 | Ø2 | D |
| Ø3C7 | Ø3 | D# |
| Ø3C8 | Ø4 | E |
| Ø3C9 | Ø5 | F |

Schedule 'A' Fret Position ROM Table -continued

|  |  |  |
|---|---|---|
| 03CA | 06 | F# |
| 03CB | 07 | G |
| 03CC | 08 | G# |
| 03CD | 09 | A |
| 03CE | 0A | A# |
| 03CF | 0B | B |

Position 2

|  |  |  |
|---|---|---|
| 03D4 | 03 | C |
| 03D5 | 04 | C# |
| 03D6 | 05 | D |
| 03D7 | 06 | D# |
| 03D8 | 07 | E |
| 03D9 | 08 | F |
| 03DA | 09 | F# |
| 03DB | 0A | G |
| 03DC | 0B | G# |
| 03DD | 00 | A |
| 03DE | 01 | A# |
| 03DF | 02 | B |

Position 3

|  |  |  |
|---|---|---|
| 03E4 | 08 | C |
| 03E5 | 09 | C# |
| 03E6 | 0A | D |
| 03E7 | 0B | D# |
| 03E8 | 00 | E |
| 03E9 | 01 | F |
| 03EA | 02 | F# |
| 03EB | 03 | G |
| 03EC | 04 | G# |
| 03ED | 05 | A |
| 03EE | 06 | A# |
| 03EF | 07 | B |

Position 4

|  |  |  |
|---|---|---|
| 03F4 | 0A | C |
| 03F5 | 0B | C# |
| 03F6 | 00 | D |
| 03F7 | 01 | D# |
| 03F8 | 02 | E |
| 03F9 | 03 | F |
| 03FA | 04 | F# |
| 03FB | 05 | G |
| 03FC | 06 | G# |
| 03FD | 07 | A |
| 03FE | 08 | A# |
| 03FF | 09 | B |

SCHEDULE 'A' Finger Position ROM Table

Position 1

| | | | | |
|---|---|---|---|---|
| FC00 | 7D | FC80 | BE | Major |
| FC01 | DF | FC81 | EF | |
| FC02 | BE | FC82 | DF | |
| FC03 | EF | FC83 | 77 | |
| FC04 | ED | FC84 | F6 | Major 6th |
| FC05 | F7 | FC85 | FB | |
| FC06 | BF | FC86 | DF | |
| FC07 | FF | FC87 | FF | |
| FC08 | 7B | FC88 | BD | Major 7th |
| FC09 | DF | FC89 | EF | |
| FC0A | BE | FC8A | DF | |
| FC0B | F7 | FC8B | 7B | |
| FC0C | 7B | FC8C | BD | Major 9th |
| FC0D | DE | FC8D | EF | |
| FC0E | FE | FC8E | 7F | |
| FC0F | FF | FC8F | 7F | |
| FC10 | 7F | FC90 | BF | Major 6-9 |
| FC11 | 77 | FC91 | BB | |
| FC12 | BF | FC92 | DF | |
| FC13 | F7 | FC93 | FB | |
| FC14 | B5 | FC94 | B5 | Minor |
| FC15 | A5 | FC95 | A5 | |
| FC16 | 4B | FC96 | 4B | |
| FC17 | 5B | FC97 | 5B | |
| FC18 | EF | FC98 | F7 | Minor 6th |
| FC19 | F6 | FC99 | FB | |
| FC1A | F7 | FC9A | 7B | |
| FC1B | F7 | FC9B | FB | |
| FC1C | ED | FC9C | F6 | Minor 7th |
| FC1D | FB | FC9D | FD | |
| FC1E | BF | FC9E | DF | |
| FC1F | FF | FC9F | FF | |
| FC20 | EF | FCA0 | F7 | Minor 9th |
| FC21 | 7B | FCA1 | BD | |
| FC22 | 7F | FCA2 | BF | |
| FC23 | FF | FCA3 | FF | |
| FC24 | 7D | FCA4 | BE | 7th |
| FC25 | FB | FCA5 | FD | |
| FC26 | BE | FCA6 | DF | |
| FC27 | F7 | FCA7 | 7B | |
| FC28 | FD | FCA8 | FE | Augmented 7th |
| FC29 | EF | FCA9 | F7 | |
| FC2A | BB | FCAA | DD | |
| FC2B | BF | FCAB | DF | |
| FC2C | EF | FCAC | F7 | 9th |
| FC2D | 7B | FCAD | BD | |
| FC2E | BF | FCAE | DF | |
| FC2F | BF | FCAF | DF | |
| FC30 | 7D | FCB0 | BE | Augmented 9th |
| FC31 | EE | FCB1 | F7 | |
| FC32 | FB | FCB2 | 7D | |
| FC33 | BF | FCB3 | DF | |
| FC34 | DD | FCB4 | EE | Diminished 7th |
| FC35 | F7 | FCB5 | FB | |
| FC36 | 7F | FCB6 | BF | |
| FC37 | FF | FCB7 | FF | |
| FC38 | 7D | FCB8 | BE | Augmented |
| FC39 | EF | FCB9 | F7 | |
| FC3A | BE | FCBA | DF | |
| FC3B | FF | FCBB | 7F | |
| FC3C | ED | FCBC | F6 | Suspended 7th |
| FC3D | FB | FCBD | FD | |
| FC3E | DF | FCBE | EF | |
| FC3F | FF | FCBF | FF | |

Position 2

| | | | | |
|---|---|---|---|---|
| FD00 | 7E | FD80 | BF | Major |
| FD01 | F7 | FD81 | 7B | |
| FD02 | BF | FD82 | DF | |
| FD03 | FF | FD83 | FF | |
| FD04 | DE | FD84 | EF | Major 6th |
| FD05 | F7 | FD85 | 7B | |
| FD06 | BF | FD86 | DF | |
| FD07 | FF | FD87 | FF | |
| FD08 | 7E | FD88 | BF | Major 7th |
| FD09 | EF | FD89 | 77 | |
| FD0A | F7 | FD8A | FB | |
| FD0B | FF | FD8B | FF | |
| FD0C | 7E | FD8C | BF | Major 9th |
| FD0D | EF | FD8D | 77 | |
| FD0E | FD | FD8E | FE | |
| FD0F | BF | FD8F | DF | |
| FD10 | B5 | FD90 | B5 | Major 6-9 |
| FD11 | A5 | FD91 | A5 | |
| FD12 | 4B | FD92 | 4B | |
| FD13 | 5B | FD93 | 5B | |
| FD14 | 7D | FD94 | BE | Minor |
| FD15 | F7 | FD95 | FB | |
| FD16 | BF | FD96 | DF | |
| FD17 | FF | FD97 | FF | |
| FD18 | DD | FD98 | EE | Minor 6th |
| FD19 | F7 | FD99 | FB | |
| FD1A | BF | FD9A | DF | |
| FD1B | FF | FD9B | FF | |
| FD1C | ED | FD9C | F6 | Minor 7th |
| FD1D | DF | FD9D | EF | |
| FD1E | B7 | FD9E | DB | |
| FD1F | BF | FD9F | DF | |
| FD20 | FB | FDA0 | FD | Minor 9th |
| FD21 | DF | FDA1 | EF | |
| FD22 | BE | FDA2 | DF | |
| FD23 | FF | FDA3 | 7F | |
| FD24 | FE | FDA4 | FF | 7th |
| FD25 | DF | FDA5 | 6F | |
| FD26 | B7 | FDA6 | DB | |
| FD27 | FF | FDA7 | FF | |
| FD28 | BE | FDA8 | DF | Augmented 7th |
| FD29 | DF | FDA9 | 6F | |

SCHEDULE 'A'-continued

Finger Position ROM Table

| | | | | |
|---|---|---|---|---|
| FD2A | D7 | FDAA | EB | |
| FD2B | FF | FDAB | FF | |
| FD2C | FB | FDAC | FD | 9th |
| FD2D | DF | FDAD | EF | |
| FD2E | B7 | FDAE | DB | |
| FD2F | BF | FDAF | DF | |
| FD30 | EE | FDB0 | F7 | Augmented 9th |
| FD31 | F7 | FDB1 | 7B | |
| FD32 | DD | FDB2 | EE | |
| FD33 | FF | FDB3 | FF | |
| FD34 | FD | FDB4 | FE | Diminished 7th |
| FD35 | F7 | FDB5 | FB | |
| FD36 | 7F | FDB6 | BF | |
| FD37 | EF | FDB7 | F7 | |
| FD38 | BE | FDB8 | DF | Augmented |
| FD39 | F7 | FDB9 | 7B | |
| FD3A | FF | FDBA | FF | |
| FD3B | FF | FDBB | FF | |
| FD3C | FF | FDBC | FF | Suspended 7th |
| FD3D | 77 | FDBD | BB | |
| FD3E | BF | FDBE | DF | |
| FD3F | F7 | FDBF | FB | |

Position 3

| | | | | |
|---|---|---|---|---|
| FE00 | 7B | FE80 | BD | Major |
| FE01 | EF | FE81 | F7 | |
| FE02 | BD | FE82 | DE | |
| FE03 | FF | FE83 | FF | |
| FE04 | 7E | FE84 | BF | Major 6th |
| FE05 | EF | FE85 | 77 | |
| FE06 | BD | FE86 | DE | |
| FE07 | BF | FE87 | DF | |
| FE08 | 7B | FE88 | BD | Major 7th |
| FE09 | EF | FE89 | F7 | |
| FE0A | 7F | FE8A | BF | |
| FE0B | FF | FE8B | FF | |
| FE0C | DB | FE8C | ED | Major 9th |
| FE0D | EF | FE8D | F7 | |
| FE0E | 7F | FE8E | BF | |
| FE0F | FF | FE8F | FF | |
| FE10 | DE | FE90 | EF | Major 6-9 |
| FE11 | EF | FE91 | 77 | |
| FE12 | FD | FE92 | FE | |
| FE13 | BF | FE93 | DF | |
| FE14 | 7B | FE94 | BD | Minor |
| FE15 | DF | FE95 | EF | |
| FE16 | BD | FE96 | DE | |
| FE17 | BF | FE97 | DF | |
| FE18 | 7E | FE98 | BF | Minor 6th |
| FE19 | DF | FE99 | 6F | |
| FE1A | FD | FE9A | FE | |
| FE1B | FF | FE9B | FF | |
| FE1C | 7B | FE9C | BD | Minor 7th |
| FE1D | DE | FE9D | EF | |
| FE1E | FF | FE9E | 7F | |
| FE1F | FF | FE9F | FF | |
| FE20 | DB | FEA0 | ED | Minor 9th |
| FE21 | DE | FEA1 | EF | |
| FE22 | FF | FEA2 | 7F | |
| FE23 | FF | FEA3 | FF | |
| FE24 | 7B | FEA4 | BD | 7th |
| FE25 | EE | FEA5 | F7 | |
| FE26 | FF | FEA6 | 7F | |
| FE27 | FF | FEA7 | FF | |
| FE28 | FD | FEA8 | FE | Augmented 7th |
| FE29 | ED | FEA9 | F6 | |
| FE2A | FF | FEAA | FF | |
| FE2B | BF | FEAB | DF | |
| FE2C | DF | FEAC | EF | 9th |
| FE2D | 6F | FEAD | B7 | |
| FE2E | BF | FEAE | DF | |
| FE2F | FF | FEAF | FF | |
| FE30 | DD | FEB0 | EE | Augmented 9th |
| FE31 | EE | FEB1 | F7 | |
| FE32 | FF | FEB2 | 7F | |
| FE33 | FF | FEB3 | FF | |
| FE34 | EE | FEB4 | F7 | Diminished 7th |
| FE35 | FB | FEB5 | 7D | |
| FE36 | BF | FEB6 | DF | |
| FE37 | FF | FEB7 | FF | |
| FE38 | FD | FEB8 | FE | Augmented |
| FE39 | EF | FEB9 | F7 | |
| FE3A | BE | FEBA | DF | |
| FE3B | FF | FEBB | 7F | |
| FE3C | FB | FEBC | FD | Suspended 7th |
| FE3D | F6 | FEBD | FB | |
| FE3E | FF | FEBE | 7F | |
| FE3F | BF | FEBF | DF | |

Position 4

| | | | | |
|---|---|---|---|---|
| FF00 | FF | FF80 | FF | Major |
| FF01 | 76 | FF81 | BB | |
| FF02 | F6 | FF82 | 7B | |
| FF03 | FF | FF83 | 7F | |
| FF04 | DB | FF84 | ED | Major 6th |
| FF05 | F6 | FF85 | FB | |
| FF06 | F7 | FF86 | 7B | |
| FF07 | FF | FF87 | FF | |
| FF08 | DE | FF88 | EF | Major 7th |
| FF09 | F6 | FF89 | 7B | |
| FF0A | F7 | FF8A | 7B | |
| FF0B | FF | FF8B | FF | |
| FF0C | DE | FF8C | EF | Major 9th |
| FF0D | F7 | FF8D | 7B | |
| FF0E | B7 | FF8E | DB | |
| FF0F | BF | FF8F | DF | |
| FF10 | DB | FF90 | ED | Major 6-9 |
| FF11 | F6 | FF91 | FB | |
| FF12 | F7 | FF92 | 7B | |
| FF13 | BF | FF93 | DF | |
| FF14 | FF | FF94 | FF | Minor |
| FF15 | 76 | FF95 | BB | |
| FF16 | F7 | FF96 | 7B | |
| FF17 | DF | FF97 | EF | |
| FF18 | BB | FF98 | DD | Minor 6th |
| FF19 | F6 | FF99 | FB | |
| FF1A | F7 | FF9A | 7B | |
| FF1B | FF | FF9B | FF | |
| FF1C | FD | FF9C | FE | Minor 7th |
| FF1D | F6 | FF9D | FB | |
| FF1E | FF | FF9E | 7F | |
| FF1F | DF | FF9F | EF | |
| FF20 | 7D | FFA0 | BE | Minor 9th |
| FF21 | F7 | FFA1 | FB | |
| FF22 | DF | FFA2 | EF | |
| FF23 | FF | FFA3 | FF | |
| FF24 | FD | FFA4 | FE | 7th |
| FF25 | F6 | FFA5 | FB | |
| FF26 | FF | FFA6 | 7F | |
| FF27 | EF | FFA7 | F7 | |
| FF28 | DD | FFA8 | EE | Augmented 7th |
| FF29 | FA | FFA9 | FD | |
| FF2A | FF | FFAA | 7F | |
| FF2B | FF | FFAB | FF | |
| FF2C | DD | FFAC | EE | 9th |
| FF2D | F6 | FFAD | FB | |
| FF2E | F7 | FFAE | 7B | |
| FF2F | BF | FFAF | DF | |
| FF30 | DD | FFB0 | EE | Augmented 9th |
| FF31 | FB | FFB1 | FD | |
| FF32 | BF | FFB2 | DF | |
| FF33 | FF | FFB3 | FF | |
| FF34 | FF | FFB4 | FF | Diminished 7th |
| FF35 | 6F | FFB5 | B7 | |
| FF36 | DD | FFB6 | EE | |
| FF37 | FF | FFB7 | FF | |
| FF38 | FF | FFB8 | FF | Augmented |
| FF39 | FA | FFB9 | FD | |
| FF3A | FB | FFBA | 7D | |
| FF3B | 7F | FFBB | F7 | |
| FF3C | ED | FFBC | F6 | Suspended 7th |
| FF3D | F6 | FFBD | FB | |
| FF3E | FF | FFBE | 7F | |
| FF3F | FF | FFBF | FF | |
| FF7E | Reset Vector | FFFE | Reset Vector | |
| FF7F | Reset Vector | FFFF | Reset Vector | |

Schedule 'B'

| | |
|---|---|
| 0000 | Temporary LED Storage for flashing |

-continued

Schedule 'B'

| | |
|---|---|
| 0001 | Key Press Duration group 1 |
| 0002 | Key Press Duration group 2 |
| 0003 | Key Press Duration group 3 |
| 0004 | "S" flag (is chord complete?) |
| 0005 | Temporary interval Storage register |
| 0006 | Temporary interval Storage register |
| 0007 | ROM Address for finger positions on frets |
| 0008 | ROM Address for finger positions on frets |
| 0009 | "P" flag (has position been selected?) |
| 000A | Temporary "KEY" Storage |
| 000B | ROM Address for fret selection |
| 000C | ROM Address for fret selection |
| 0F00 | FRET Position Latch |
| 0F01 | Latches for finger positions |
| 0F02 | Latches for finger positions |
| 0F03 | Latches for finger positions |
| 0F04 | Latches for finger positions |
| 0F05 | T/S buffers for switches |
| 0F06 | T/S buffers for switches |
| 0F07 | T/S buffers for switches |
| 0380–03BF | Valid chord look up table |
| 03C0–03FF | Fret position ROM table |
| FC00–FFFD | Finger position ROM table |
| FFFE–FFFF | Reset Vector |

Schedule 'B'
Valid Cord Look up Table

| | |
|---|---|
| 0380 | A4 |
| 0381 | 00 |
| 0382 | A5 |
| 0383 | 10 |
| 0384 | A5 |
| 0385 | 00 |
| 0386 | A4 |
| 0387 | 40 |
| 0388 | A4 |
| 0389 | 50 |
| 038A | C4 |
| 038B | 00 |
| 038C | C5 |
| 038D | 00 |
| 038E | C4 |
| 038F | 40 |
| 0390 | C4 |
| 0391 | 80 |
| 0392 | C8 |
| 0393 | 80 |
| 0394 | 00 |
| 0395 | 00 |
| 0396 | C4 |
| 0397 | 80 |
| 0398 | C4 |
| 0399 | 94 |
| 039A | A4 |
| 039B | 80 |
| 039C | A8 |
| 039D | 80 |
| 039E | A2 |
| 039F | 80 |
| 03A0 | A4 |
| 03A1 | A0 |
| 03A2 | A4 |
| 03A3 | 90 |
| 03A4 | A4 |
| 03A5 | 88 |
| 03A6 | A8 |
| 03A7 | 90 |
| 03A8 | A2 |
| 03A9 | 90 |
| 03AA | 00 |
| 03AB | 00 |
| 03AC | 00 |
| 03AD | 00 |
| 03AE | 00 |
| 03AF | 00 |
| 03B0 | 00 |
| 03B1 | 00 |

-continued

Schedule 'B'
Valid Cord Look up Table

| | |
|---|---|
| 03B2 | A4 |
| 03B3 | 94 |
| 03B4 | A4 |
| 03B5 | 96 |
| 03B6 | C9 |
| 03B7 | 00 |
| 03B8 | 94 |
| 03B9 | 00 |
| 03BA | 94 |
| 03BB | 80 |
| 03BC | 00 |
| 03BD | 00 |
| 03BE | XX |
| 03BF | XX |

Schedule 'B'
Reset Routine

| | | | |
|---|---|---|---|
| | LDA A | #$03 | |
| | STA A | $0B | |
| LED Flash | INC | $0000 | |
| | LDA A | $00 | |
| | STA A | $0F00 | |
| Key Press | LDA A | $0F05 | |
| | TST A | | |
| | BNE | Key Group 1 | |
| | LDA A | $0F06 | |
| | TST A | | |
| | BNE | Key Group 2 | |
| | LDA A | $0F07 | |
| | TST A | | |
| | BNE | Key Group 3 | |
| | CLR | $0001 | |
| | CLR | $0002 | |
| | CLR | $0003 | |
| | TST | $0004 | S Flag |
| | BNE | Key Press | |
| | JMP | LED Flash | |
| Key Group 1 | CLR | $0002 | |
| | CLR | $0003 | |
| | INC | $0001 | |
| | LDA B | #$32 | |
| | CMP B | $01 | |
| | BNE | Key Press | |
| | TST | $0004 | S Flag |
| | BNE | "KEY" Key 1 | |
| | ORA A | $05 | |
| | STA A | $05 | |
| | JMP | LED Flash | |
| Key Group 2 | CLR | $0001 | |
| | CLR | $0003 | |
| | INC | $0002 | |
| | LDA B | #$32 | |
| | CMP B | $02 | |
| | BNE | Key Press | |
| | TST | $0004 | S Flag |
| | BNE | "KEY" Key 2 | |
| | LSR A | | |
| | BCS | Chord Valid? | |
| | ROL A | | |
| | ORA A | $06 | |
| | STA A | $06 | |
| | JMP | LED Flash | |
| Key Group 3 | CLR | $0001 | |
| | CLR | $0002 | |
| | INC | 0003 | |
| | LDA B | #$32 | |
| | CMP B | $03 | |
| | BNE | Key Press | |
| | LDA B | #$FC | |
| | STA B | $0007 | |
| | LDA B | #$03 | |
| Pos Search | LSR A | | |
| | BCS | Display | |
| | INC | $0007 | |
| | DEC B | | |
| | BEQ | Display | |

-continued
Schedule 'B'
Reset Routine

|  | JMP | Pos Search |  |
|---|---|---|---|
| Chord Valid | CLR A |  |  |
|  | LDX | #$0380 |  |
| Test | CPX | $05 |  |
|  | BEQ | Valid |  |
|  | INX |  |  |
|  | INX |  |  |
|  | ADD A | #$04 |  |
|  | CMP A | #$7C |  |
|  | BEQ | Reset | (Invalid Chord) |
|  | JMP | Test |  |
| Valid | STA A | $08 |  |
|  | LDA A | #$01 |  |
|  | STA A | $04 | Set 'S' Flag |
|  | JMP | Key Press |  |
| "KEY" Key 1 | CLR | $000A |  |
|  | LDA B | #$07 |  |
| Key Search 1 | ROL A |  |  |
|  | BCS | Display + 1 |  |
|  | INC | $000A |  |
|  | DEC B |  |  |
|  | BEQ | Key Press |  |
|  | JMP | Key Search 1 |  |
| "KEY" Key 2 | LDA B | #$08 |  |
|  | STA B | $0A |  |
|  | LDA B | #03 |  |
| Key Search 2 | ROL A |  |  |
|  | BCS | Display + 1 |  |
|  | INC | $000A |  |
|  | DEC B |  |  |
|  | BEQ | Key Press |  |
|  | JMP | Key Search 2 |  |
| Display | LDA A | #$01 |  |
|  | STA A | $09 | Set 'P' Flag |
| Display + 1 | TST | $0009 |  |
|  | BEQ | Key Press |  |
|  | TST | $0004 |  |
|  | BEQ | Key Press |  |
|  | LDA A | #$0F |  |
|  | AND A | $07 |  |
|  | ASL A |  |  |
|  | ASL A |  |  |
|  | ASL A |  |  |
|  | ASL A |  |  |
|  | ORA A | $0A |  |
|  | STA A | $0C |  |
|  | LDX | $0B |  |
|  | LDA A, X | $00 |  |
|  | STA A | $0F00 |  |
|  | LDX | $07 |  |
|  | LDA A, X | $00 |  |
|  | STA A | $0F01 |  |
|  | LDA A, X | $01 |  |
|  | STA A | $0F02 |  |
|  | LDA A, X | $02 |  |
|  | STA A | $0F03 |  |
|  | LDA A, X | $03 |  |
|  | STA A | $0F04 |  |
|  | JMP | Key Press |  |

Schedule 'B'
Fret Position ROM Table

Position 1

| | | |
|---|---|---|
| 03C0 | 00 | C |
| 03C1 | 01 | C# |
| 03C2 | 02 | D |
| 03C3 | 03 | D# |
| 03C4 | 04 | E |
| 03C5 | 05 | F |
| 03C6 | 06 | F# |
| 03C7 | 07 | G |
| 03C8 | 08 | G# |
| 03C9 | 09 | A |
| 03CA | 0A | A# |
| 03CB | 0B | B |

Position 2

-continued
Schedule 'B'
Fret Position ROM Table

| | | |
|---|---|---|
| 03D0 | 03 | C |
| 03D1 | 04 | C# |
| 03D2 | 05 | D |
| 03D3 | 06 | D# |
| 03D4 | 07 | E |
| 03D5 | 08 | F |
| 03D6 | 09 | F# |
| 03D7 | 0A | G |
| 03D8 | 0B | G# |
| 03D9 | 00 | A |
| 03DA | 01 | A# |
| 03DB | 02 | B |

Position 3

| | | |
|---|---|---|
| 03E0 | 08 | C |
| 03E1 | 09 | C# |
| 03E2 | 0A | D |
| 03E3 | 0B | D# |
| 03E4 | 00 | E |
| 03E5 | 01 | F |
| 03E6 | 02 | F# |
| 03E7 | 03 | G |
| 03E8 | 04 | G# |
| 03E9 | 05 | A |
| 03EA | 06 | A# |
| 03EB | 07 | B |

Position 4

| | | |
|---|---|---|
| 03F0 | 0A | C |
| 03F1 | 0B | C# |
| 03F2 | 00 | D |
| 03F3 | 01 | D# |
| 03F4 | 02 | E |
| 03F5 | 03 | F |
| 03F6 | 04 | F# |
| 03F7 | 05 | G |
| 03F8 | 06 | G# |
| 03F9 | 07 | A |
| 03FA | 08 | A# |
| 03FB | 09 | B |

SCHEDULE 'B'
Finger Position ROM Table

Position 1

| | | | | |
|---|---|---|---|---|
| FC00 | 7D | FC80 | BE | Major |
| FC01 | DF | FC81 | EF |  |
| FC02 | BE | FC82 | DF |  |
| FC03 | EF | FC83 | 77 |  |
| FC04 | 7F | FC84 | BF | Major 6-9 |
| FC05 | 77 | FC85 | BB |  |
| FC06 | BF | FC86 | DF |  |
| FC07 | F7 | FC87 | FB |  |
| FC08 | ED | FC88 | F6 | Major 6th |
| FC09 | F7 | FC89 | FB |  |
| FC0A | BF | FC8A | DF |  |
| FC0B | FF | FC8B | FF |  |
| FC0C | 7B | FC8C | BD | Major 7th |
| FC0D | DF | FC8D | EF |  |
| FC0E | BE | FC8E | DF |  |
| FC0F | F7 | FC8F | 7B |  |
| FC10 | 7B | FC90 | BD | Major 9th |
| FC11 | DE | FC91 | EF |  |
| FC12 | FE | FC92 | 7F |  |
| FC13 | FF | FC93 | 7F |  |
| FC14 | B5 | FC94 | B5 | Minor |
| FC15 | A5 | FC95 | A5 |  |
| FC16 | 4B | FC96 | 4B |  |
| FC17 | 5B | FC97 | 5B |  |
| FC18 | EF | FC98 | F7 | Minor 6th |
| FC19 | F6 | FC99 | FB |  |
| FC1A | F7 | FC9A | 7B |  |
| FC1B | F7 | FC9B | FB |  |
| FC1C | FB | FC9C | FD | Minor +7 |
| FC1D | DF | FC9D | EF |  |
| FC1E | 7E | FC9E | BF |  |
| FC1F | FF | FC9F | 7F |  |
| FC20 | ED | FCA0 | F6 | Minor 7th |
| FC21 | FB | FCA1 | FD |  |

SCHEDULE 'B'-continued

Finger Position ROM Table

| | | | | |
|---|---|---|---|---|
| FC22 | BF | FCA2 | DF | |
| FC23 | FF | FCA3 | FF | |
| FC24 | DD | FCA4 | EE | Minor 7th (b5) |
| FC25 | FB | FCA5 | FD | |
| FC26 | 7F | FCA6 | BF | |
| FC27 | FF | FCA7 | FF | |
| FC28 | XX | FCA8 | XX | N/A |
| FC29 | XX | FCA9 | XX | |
| FC2A | XX | FCAA | XX | |
| FC2B | XX | FCAB | XX | |
| FC2C | EF | FCAC | F7 | Minor 9th |
| FC2D | 7B | FCAD | BD | |
| FC2E | 7F | FCAE | BF | |
| FC2F | FF | FCAF | FF | |
| FC30 | BF | FCB0 | DF | Minor 11th |
| FC31 | 7B | FCB1 | BD | |
| FC32 | 7F | FCB2 | BF | |
| FC33 | FF | FCB3 | FF | |
| FC34 | 7D | FCB4 | BE | 7th |
| FC35 | FB | FCB5 | FD | |
| FC36 | BE | FCB6 | DF | |
| FC37 | F7 | FCB7 | 7B | |
| FC38 | DD | FCB8 | EE | 7th (b5) |
| FC39 | FB | FCB9 | FD | |
| FC3A | BF | FCBA | DF | |
| FC3B | FF | FCBB | FF | |
| FC3C | FD | FCBC | FE | 7th (#5) |
| FC3D | EF | FCBD | F7 | |
| FC3E | BB | FCBE | DD | |
| FC3F | BF | FCBF | DF | |
| FC40 | EE | FCC0 | F7 | 7th (b9) |
| FC41 | FB | FCC1 | 7D | |
| FC42 | BF | FCC2 | DF | |
| FC43 | FF | FCC3 | FF | |
| FC44 | EF | FCC4 | F7 | 9th |
| FC45 | 7B | FCC5 | BD | |
| FC46 | BF | FCC6 | DF | |
| FC47 | BF | FCC7 | DF | |
| FC48 | FD | FCC8 | FE | 7th (#9) |
| FC49 | DF | FCC9 | EF | |
| FC4A | 7B | FCCA | BD | |
| FC4B | BF | FCCB | DF | |
| FC4C | DF | FCCC | EF | 9th (b5) |
| FC4D | 7B | FCCD | BD | |
| FC4E | BE | FCCE | DF | |
| FC4F | FF | FCCF | 7F | |
| FC50 | 7D | FCD0 | BE | 9th (#5) |
| FC51 | EE | FCD1 | F7 | |
| FC52 | FB | FCD2 | 7D | |
| FC53 | BF | FCD3 | DF | |
| FC54 | XX | FCD4 | XX | N/A |
| FC55 | XX | FCD5 | XX | |
| FC56 | XX | FCD6 | XX | |
| FC57 | XX | FCD7 | XX | |
| FC58 | XX | FCD8 | XX | N/A |
| FC59 | XX | FCD9 | XX | |
| FC5A | XX | FCDA | XX | |
| FC5B | XX | FCDB | XX | |
| FC5C | XX | FCDC | XX | N/A |
| FC5D | XX | FCDD | XX | |
| FC5E | XX | FCDE | XX | |
| FC5F | XX | FCDF | XX | |
| FC60 | XX | FCE0 | XX | N/A |
| FC61 | XX | FCE1 | XX | |
| FC62 | XX | FCE2 | XX | |
| FC63 | XX | FCE3 | XX | |
| FC64 | B5 | FCE4 | B5 | 11th |
| FC65 | A5 | FCE5 | A5 | |
| FC66 | 4B | FCE6 | 4B | |
| FC67 | 5B | FCE7 | 5B | |
| FC68 | B5 | FCE8 | B5 | 13th |
| FC69 | A5 | FCE9 | A5 | |
| FC6A | 4B | FCEA | 4B | |
| FC6B | 5B | FCEB | 5B | |
| FC6C | DD | FCEC | EE | Diminished 7th |
| FC6D | F7 | FCED | FB | |
| FC6E | 7F | FCEE | BF | |
| FC6F | FF | FCEF | FF | |
| FC70 | FD | FCF0 | FE | Suspended |
| FC71 | DF | FCF1 | EF | |
| FC72 | DE | FCF2 | EF | |
| FC73 | FF | FCF3 | 7F | |
| FC74 | ED | FCF4 | F6 | Suspended 7th |
| FC75 | FB | FCF5 | FD | |
| FC76 | DF | FCF6 | EF | |
| FC77 | FF | FCF7 | FF | |
| FC78 | XX | FCF8 | XX | N/A |
| FC79 | XX | FCF9 | XX | |
| FC7A | XX | FCFA | XX | |
| FC7B | XX | FCFB | XX | |
| FC7C | XX | FCFC | XX | N/A |
| FC7D | XX | FCFD | XX | |
| FC7E | XX | FCFE | XX | |
| FC7F | XX | FCFF | XX | |

Position 2

| | | | | |
|---|---|---|---|---|
| FD00 | 7E | FD80 | BF | Major |
| FD01 | F7 | FD81 | 7B | |
| FD02 | BF | FD82 | DF | |
| FD03 | FF | FD83 | FF | |
| FD04 | B5 | FD84 | B5 | Major 6-9 |
| FD05 | A5 | FD85 | A5 | |
| FD06 | 4B | FD86 | 4B | |
| FD07 | 5B | FD87 | 5B | |
| FD08 | DE | FD88 | EF | Major 6th |
| FD09 | F7 | FD89 | 7B | |
| FD0A | BF | FD8A | DF | |
| FD0B | FF | FD8B | FF | |
| FD0C | 7E | FD8C | BF | Major 7th |
| FD0D | EF | FD8D | 77 | |
| FD0E | F7 | FD8E | FB | |
| FD0F | FF | FD8F | FF | |
| FD10 | 7E | FD90 | BF | Major 9th |
| FD11 | EF | FD91 | 77 | |
| FD12 | FD | FD92 | FE | |
| FD13 | BF | FD93 | DF | |
| FD14 | 7D | FD94 | BE | Minor |
| FD15 | F7 | FD95 | FB | |
| FD16 | BF | FD96 | DF | |
| FD17 | FF | FD97 | FF | |
| FD18 | DD | FD98 | EE | Minor 6th |
| FD19 | F7 | FD99 | FB | |
| FD1A | BF | FD9A | DF | |
| FD1B | FF | FD9B | FF | |
| FD1C | 7D | FD9C | BF | Minor +7 |
| FD1D | EF | FD9D | F7 | |
| FD1E | B7 | FD9E | DB | |
| FD1F | BF | FD9F | DF | |
| FD20 | ED | FDA0 | F6 | Minor 7th |
| FD21 | DF | FDA1 | EF | |
| FD22 | B7 | FDA2 | DB | |
| FD23 | BF | FDA3 | DF | |
| FD24 | FD | FDA4 | FE | Minor 7th (b5) |
| FD25 | DF | FDA5 | EF | |
| FD26 | 77 | FDA6 | BB | |
| FD27 | FF | FDA7 | FF | |
| FD28 | XX | FDA8 | XX | N/A |
| FD29 | XX | FDA9 | XX | |
| FD2A | XX | FDAA | XX | |
| FD2B | XX | FDAB | XX | |
| FD2C | FB | FDAC | FD | Minor 9th |
| FD2D | DF | FDAD | EF | |
| FD2E | BE | FDAE | DF | |
| FD2F | FF | FDAF | 7F | |
| FD30 | FB | FDB0 | FD | Minor 11th |
| FD31 | DE | FDB1 | EF | |
| FD32 | FE | FDB2 | 7F | |
| FD33 | FF | FDB3 | 7F | |
| FD34 | FE | FDB4 | FF | 7th |
| FD35 | DF | FDB5 | 6F | |
| FD36 | B7 | FDB6 | DB | |
| FD37 | FF | FDB7 | FF | |
| FD38 | EE | FDB8 | F7 | 7th (b5) |
| FD39 | F7 | FDB9 | 7B | |
| FD3A | 7F | FDBA | BF | |
| FD3B | FF | FDBB | FF | |
| FD3C | BE | FDBC | DF | 7th (#5) |
| FD3D | DF | FDBD | 6F | |
| FD3E | D7 | FDBE | EB | |
| FD3F | FF | FDBF | FF | |
| FD40 | 7E | FDC0 | BF | 7th (b9) |
| FD41 | DF | FDC1 | 6F | |

SCHEDULE 'B'-continued

Finger Position ROM Table

| | | | | |
|---|---|---|---|---|
| FD42 | BB | FDC2 | DD | |
| FD43 | BF | FDC3 | DF | |
| FD44 | FB | FDC4 | FD | 9th |
| FD45 | DF | FDC5 | EF | |
| FD46 | B7 | FDC6 | DB | |
| FD47 | BF | FDC7 | DF | |
| FD48 | FD | FDC8 | FE | 7th (#9) |
| FD49 | DF | FDC9 | EF | |
| FD4A | B7 | FDCA | DB | |
| FD4B | FF | FDCB | FF | |
| FD4C | B5 | FDCC | B5 | 9th (b5) |
| FD4D | A5 | FDCD | A5 | |
| FD4E | 4B | FDCE | 4B | |
| FD4F | 5B | FDCF | 5B | |
| FD50 | EE | FDD0 | FF | 9th (#5) |
| FD51 | F7 | FDD1 | BB | |
| FD52 | DD | FDD2 | DF | |
| FD53 | FF | FDD3 | FB | |
| FD54 | XX | FDD4 | XX | N/A |
| FD55 | XX | FDD5 | XX | |
| FD56 | XX | FDD6 | XX | |
| FD57 | XX | FDD7 | XX | |
| FD58 | XX | FDD8 | XX | N/A |
| FD59 | XX | FDD9 | XX | |
| FD5A | XX | FDDA | XX | |
| FD5B | XX | FDDB | XX | |
| FD5C | XX | FDDC | XX | N/A |
| FD5D | XX | FDDD | XX | |
| FD5E | XX | FDDE | XX | |
| FD5F | XX | FDDF | XX | |
| FD60 | XX | FDE0 | XX | N/A |
| FD61 | XX | FDE1 | XX | |
| FD62 | XX | FDE2 | XX | |
| FD63 | XX | FDE3 | XX | |
| FD64 | 7B | FDE4 | BD | 11th |
| FD65 | DE | FDE5 | EF | |
| FD66 | FF | FDE6 | 7F | |
| FD67 | FF | FDE7 | FF | |
| FD68 | EE | FDE8 | F7 | 13th |
| FD69 | F7 | FDE9 | 7B | |
| FD6A | BD | FDEA | DE | |
| FD6B | EF | FDEB | F7 | |
| FD6C | FD | FDEC | FE | Diminished 7th |
| FD6D | F7 | FDED | FB | |
| FD6E | 7F | FDEE | BF | |
| FD6F | EF | FDEF | F7 | |
| FD70 | 7F | FDF0 | BF | Suspended |
| FD71 | 76 | FDF1 | BB | |
| FD72 | F7 | FDF2 | 7B | |
| FD73 | BF | FDF3 | DF | |
| FD74 | FF | FDF4 | FF | Suspended 7th |
| FD75 | 77 | FDF5 | BB | |
| FD76 | FF | FDF6 | DF | |
| FD77 | F7 | FDF7 | FB | |
| FD78 | XX | FDF8 | XX | N/A |
| FD79 | XX | FDF9 | XX | |
| FD7A | XX | FDFA | XX | |
| FD7B | XX | FDFB | XX | |
| FD7C | XX | FDFC | XX | N/A |
| FD7D | XX | FDFD | XX | |
| FD7E | XX | FDFE | XX | |
| FD7F | XX | FDFF | XX | |
| | | Position 3 | | |
| FE00 | 7B | FE80 | BD | Major |
| FE01 | EF | FE81 | F7 | |
| FE02 | BD | FE82 | DE | |
| FE03 | FF | FE83 | FF | |
| FE04 | DE | FE84 | EF | Major 6-9 |
| FE05 | EF | FE85 | 77 | |
| FE06 | FD | FE86 | FE | |
| FE07 | BF | FE87 | DF | |
| FE08 | 7E | FE88 | BF | Major 6th |
| FE09 | EF | FE89 | 77 | |
| FE0A | BD | FE8A | DE | |
| FE0B | BF | FE8B | DF | |
| FE0C | 7B | FE8C | BD | Major 7th |
| FE0D | EF | FE8D | F7 | |
| FE0E | 7F | FE8E | BF | |
| FE0F | FF | FE8F | FF | |
| FE10 | DB | FE90 | ED | Major 9th |
| FE11 | EF | FE91 | F7 | |
| FE12 | 7F | FE92 | BF | |
| FE13 | FF | FE93 | FF | |
| FE14 | 7B | FE94 | BD | Minor |
| FE15 | DF | FE95 | EF | |
| FE16 | BD | FE96 | DE | |
| FE17 | BF | FE97 | DF | |
| FE18 | 7E | FE98 | BF | Minor 6th |
| FE19 | DF | FE99 | 6F | |
| FE1A | FD | FE9A | FE | |
| FE1B | FF | FE9B | FF | |
| FE1C | 7B | FE9C | BD | Minor +7 |
| FE1D | DF | FE9D | EF | |
| FE1E | 7D | FE9E | BE | |
| FE1F | BF | FE9F | DF | |
| FE20 | 7B | FEA0 | BD | Minor 7th |
| FE21 | DE | FEA1 | EF | |
| FE22 | FF | FEA2 | 7F | |
| FE23 | FF | FEA3 | FF | |
| FE24 | EF | FEA4 | F7 | Minor 7th (b5) |
| FE25 | 7B | FEA5 | BD | |
| FE26 | BF | FEA6 | DF | |
| FE27 | FF | FEA7 | FF | |
| FE28 | XX | FEA8 | XX | N/A |
| FE29 | XX | FEA9 | XX | |
| FE2A | XX | FEAA | XX | |
| FE2B | XX | FEAB | XX | |
| FE2C | DB | FEAC | ED | Minor 9th |
| FE2D | DE | FEAD | EF | |
| FE2E | FF | FEAE | 7F | |
| FE2F | FF | FEAF | FF | |
| FE30 | DB | FEB0 | ED | Minor 11th |
| FE31 | DE | FEB1 | EF | |
| FE32 | F7 | FEB2 | 7B | |
| FE33 | FF | FEB3 | FF | |
| FE34 | 7B | FEB4 | BD | 7th |
| FE35 | EE | FEB5 | F7 | |
| FE36 | FF | FEB6 | 7F | |
| FE37 | FF | FEB7 | FF | |
| FE38 | FF | FEB8 | FF | 7th (b5) |
| FE39 | EE | FEB9 | F7 | |
| FE3A | FB | FEBA | 7D | |
| FE3B | BF | FEBB | DF | |
| FE3C | FD | FEBC | FE | 7th (#5) |
| FE3D | ED | FEBD | F6 | |
| FE3E | FF | FEBE | FF | |
| FE3F | BF | FEBF | DF | |
| FE40 | FF | FEC0 | FF | 7th (b9) |
| FE41 | EE | FEC1 | F7 | |
| FE42 | FD | FEC2 | 7E | |
| FE43 | DF | FEC3 | EF | |
| FE44 | DF | FEC4 | EF | 9th |
| FE45 | 6F | FEC5 | B7 | |
| FE46 | BF | FEC6 | DF | |
| FE47 | FF | FEC7 | FF | |
| FE48 | EB | FEC8 | F5 | 7th (#9) |
| FE49 | EE | FEC9 | F7 | |
| FE4A | FD | FECA | 7E | |
| FE4B | BF | FECB | DF | |
| FE4C | FF | FECC | FF | 9th (b5) |
| FE4D | EE | FECD | F7 | |
| FE4E | FB | FECE | 7D | |
| FE4F | EF | FECF | F7 | |
| FE50 | DD | FED0 | EE | 9th (#5) |
| FE51 | EE | FED1 | F7 | |
| FE52 | FF | FED2 | 7F | |
| FE53 | FF | FED3 | FF | |
| FE54 | XX | FED4 | XX | N/A |
| FE55 | XX | FED5 | XX | |
| FE56 | XX | FED6 | XX | |
| FE57 | XX | FED7 | XX | |
| FE58 | XX | FED8 | XX | N/A |
| FE59 | XX | FED9 | XX | |
| FE5A | XX | FEDA | XX | |
| FE5B | XX | FEDB | XX | |
| FE5C | XX | FEDC | XX | N/A |
| FE5D | XX | FEDD | XX | |
| FE5E | XX | FEDE | XX | |
| FE5F | XX | FEDF | XX | |
| FE60 | XX | FEE0 | XX | N/A |
| FE61 | XX | FEE1 | XX | |

SCHEDULE 'B'-continued

Finger Position ROM Table

| Addr | Val | Addr | Val | Chord | Addr | Val | Addr | Val | Chord |
|---|---|---|---|---|---|---|---|---|---|
| FE62 | XX | FEE2 | XX | | FF31 | DE | FFB1 | EF | |
| FE63 | XX | FEE3 | XX | | FF32 | F7 | FFB2 | 7B | |
| FE64 | DB | FEE4 | ED | 11th | FF33 | FF | FFB3 | FF | |
| FE65 | F6 | FEE5 | FB | | FF34 | FD | FFB4 | FE | 7th |
| FE66 | FF | FEE6 | 7F | | FF35 | F6 | FFB5 | FB | |
| FE67 | FF | FEE7 | FF | | FF36 | FF | FFB6 | 7F | |
| FE68 | DE | FEE8 | EF | 13th | FF37 | EF | FFB7 | F7 | |
| FE69 | EE | FEE9 | 77 | | FF38 | DD | FFB8 | EE | 7th (b5) |
| FE6A | FD | FEEA | 7E | | FF39 | EE | FFB9 | F7 | |
| FE6B | BF | FEEB | DF | | FF3A | FF | FFBA | 7F | |
| FE6C | EE | FEEC | F7 | Diminished 7th | FF3B | FF | FFBB | FF | |
| FE6D | FB | FEED | 7D | | FF3C | DD | FFBC | EE | 7th (#5) |
| FE6E | BF | FEEE | DF | | FF3D | FA | FFBD | FD | |
| FE6F | FF | FEEF | FF | | FF3E | FF | FFBE | 7F | |
| FE70 | 7B | FEF0 | BD | Suspended | FF3F | FF | FFBF | FF | |
| FE71 | F7 | FEF1 | FB | | FF40 | DD | FFC0 | EE | 7th (b9) |
| FE72 | B7 | FEF2 | DB | | FF41 | F7 | FFC1 | FB | |
| FE73 | FF | FEF3 | FF | | FF42 | 7F | FFC2 | BF | |
| FE74 | FB | FEF4 | FD | Suspended 7th | FF43 | FF | FFC3 | FF | |
| FE75 | F6 | FEF5 | FB | | FF44 | DD | FFC4 | EE | 9th |
| FE76 | FF | FEF6 | 7F | | FF45 | F6 | FFC5 | FB | |
| FE77 | BF | FEF7 | DF | | FF46 | F7 | FFC6 | 7B | |
| FE78 | XX | FEF8 | XX | N/A | FF47 | BF | FFC7 | DF | |
| FE79 | XX | FEF9 | XX | | FF48 | BD | FFC8 | DE | 7th (#9) |
| FE7A | XX | FEFA | XX | | FF49 | F6 | FFC9 | FB | |
| FE7B | XX | FEFB | XX | | FF4A | F7 | FFCA | 7B | |
| FE7C | XX | FEFC | XX | N/A | FF4B | FF | FFCB | FF | |
| FE7D | XX | FEFD | XX | | FF4C | FD | FFCC | FE | 9th (b5) |
| FE7E | XX | FEFE | XX | | FF4D | EF | FFCD | F7 | |
| FE7F | XX | FEFF | XX | | FF4E | BF | FFCE | DF | |
| | | | | Position 4 | FF4F | EF | FFCF | F7 | |
| FF00 | FF | FF80 | FF | Major | FF50 | DD | FFD0 | EE | 9th (#5) |
| FF01 | 76 | FF81 | BB | | FF51 | FB | FFD1 | FD | |
| FF02 | F6 | FF82 | 7B | | FF52 | BF | FFD2 | DF | |
| FF03 | FF | FF83 | 7F | | FF53 | FF | FFD3 | FF | |
| FF04 | DB | FF84 | ED | Major 6-9 | FF54 | XX | FFD4 | XX | N/A |
| FF05 | F6 | FF85 | FB | | FF55 | XX | FFD5 | XX | |
| FF06 | F7 | FF86 | 7B | | FF56 | XX | FFD6 | XX | |
| FF07 | BF | FF87 | DF | | FF57 | XX | FFD7 | XX | |
| FF08 | DB | FF88 | ED | Major 6th | FF58 | XX | FFD8 | XX | N/A |
| FF09 | F6 | FF89 | FB | | FF59 | XX | FFD9 | XX | |
| FF0A | F7 | FF8A | 7B | | FF5A | XX | FFDA | XX | |
| FF0B | FF | FF8B | FF | | FF5B | XX | FFDB | XX | |
| FF0C | DE | FF8C | EF | Major 7th | FF5C | XX | FFDC | XX | N/A |
| FF0D | F6 | FF8D | 7B | | FF5D | XX | FFDD | XX | |
| FF0E | F7 | FF8E | 7B | | FF5E | XX | FFDE | XX | |
| FF0F | FF | FF8F | FF | | FF5F | XX | FFDF | XX | |
| FF10 | DE | FF90 | EF | Major 9th | FF60 | XX | FFE0 | XX | N/A |
| FF11 | F7 | FF91 | 7B | | FF61 | XX | FFE1 | XX | |
| FF12 | B7 | FF92 | DB | | FF62 | XX | FFE2 | XX | |
| FF13 | BF | FF93 | DF | | FF63 | XX | FFE3 | XX | |
| FF14 | FF | FF94 | FF | Minor | FF64 | 7D | FFE4 | BE | 11th |
| FF15 | 76 | FF95 | BB | | FF65 | DF | FFE5 | EF | |
| FF16 | F7 | FF96 | 7B | | FF66 | F7 | FFE6 | FB | |
| FF17 | DF | FF97 | EF | | FF67 | FF | FFE7 | FF | |
| FF18 | BB | FF98 | DD | Minor 6th | FF68 | B5 | FFE8 | B5 | 13th |
| FF19 | F6 | FF99 | FB | | FF69 | A5 | FFE9 | A5 | |
| FF1A | F7 | FF9A | 7B | | FF6A | 4B | FFEA | 4B | |
| FF1B | FF | FF9B | FF | | FF6B | 5B | FFEB | 5B | |
| FF1C | BE | FF9C | DF | Minor +7 | FF6C | FF | FFEC | EF | Diminished 7th |
| FF1D | F6 | FF9D | 7B | | FF6D | 6F | FFED | B7 | |
| FF1E | F7 | FF9E | 7B | | FF6E | DD | FFEE | EE | |
| FF1F | FF | FF9F | FF | | FF6F | FF | FFEF | FF | |
| FF20 | FD | FFA0 | FE | Minor 7th | FF70 | EF | FFF0 | F7 | Suspended |
| FF21 | F6 | FFA1 | FB | | FF71 | 76 | FFF1 | BB | |
| FF22 | FF | FFA2 | 7F | | FF72 | F7 | FFF2 | 7B | |
| FF23 | DF | FFA3 | EF | | FF73 | FF | FFF3 | FF | |
| FF24 | FD | FFA4 | FE | Minor 7th (b5) | FF74 | ED | FFF4 | F6 | Suspended 7th |
| FF25 | EE | FFA5 | F7 | | FF75 | F6 | FFF5 | FB | |
| FF26 | FB | FFA6 | 7D | | FF76 | FF | FFF6 | 7F | |
| FF27 | FF | FFA7 | FF | | FF77 | FF | FFF7 | FF | |
| FF28 | XX | FFA8 | XX | N/A | FF78 | XX | FFF8 | XX | N/A |
| FF29 | XX | FFA9 | XX | | FF79 | XX | FFF9 | XX | |
| FF2A | XX | FFAA | XX | | FF7A | XX | FFFA | XX | |
| FF2B | XX | FFAB | XX | | FF7B | XX | FFFB | XX | |
| FF2C | 7D | FFAC | BE | Minor 9th | FF7C | XX | FFFC | XX | N/A |
| FF2D | F7 | FFAD | FB | | FF7D | XX | FFFD | XX | |
| FF2E | DF | FFAE | EF | | FF7E | Reset Vector | FFFE | Reset Vector | |
| FF2F | FF | FFAF | FF | | FF7F | Reset Vector | FFFF | Reset Vector | |
| FF30 | 7D | FFB0 | BE | Minor 11th | | | | | |

What I claim as my invention:

1. An electronic device in the nature of a hand held calculator, for illustrating on a display area the required string and fret positions of a fretted stringed instrument to be fingered to play the notes making up a particular chord, comprising:
   (a) a series of manually operable basic chord information buttons, each associated with a corresponding chord information switch, one chord information switch for each chord for which finger position information is desired;
   (b) a visual representation of the strings of the fretted instrument and of the frets over a particular range;
   (c) electronically actuated fret and string finger position indicator means associated with the fret and string representation, each of the string finger positions for each of the frets having electronically actuable indicator means associated with it;
   (d) electronically actuated open string position indicator means associated with each string of the fret and string representation to indicate when a corresponding string is not fingered;
   (e) electronically actuated first fret reference indicator means to represent a fret reference point for a selected chord;
   (f) manually operable select means associated with select switch means;
   (g) ROM means programmed with chord table information relating chords to desired keys with related fret and string finger position information;
   (h) microprocessor means electronically associated with the chord information switches, open string position indicator means, first fret reference indicator means, fret and string finger position indicator means and select switch means, the microprocessor adapted to store information concerning the particular chord information switch or switches actuated until the select switch means is actuated, and then search the ROM for fret and finger position information corresponding to the chord information switch or switches actuated, and display that information on the appropriate fret and string finger position indicator means, open string position means and first fret reference indicator means;
   (i) manually operable switch means electronically associated with the microprocessor and fret and string finger position indicator means to clear information displayed on the fret and string representation as required; whereby the device provides an accurate visible indication on the fret and string representation, of the strings and fret positions to be fingered for a selected predetermined chord.

2. A device according to claim 1 wherein the fret and string representation of the strings is of a four fret range.

3. A device according to claim 1 wherein each key in the chromatic scale is represented by a basic chord information button and corresponding chord information switch, each such switch being not simultaneously actuable with respect to other such chord switches and wherein a series of chord indicator buttons and corresponding chord indicator switches representing types of chords are further provided, the chord indicator switches being electronically associated with the microprocessor and each being not simultaneously actuable with each other but simultaneously actuable with the chord information switches, the microprocessor being also adapted to store information regarding the particular chord indicator switch actuated until the select switch means is actuated, and then to search the ROM means for fret and finger position information corresponding to the chord information and the chord indicator switches which are actuated and display that information on the appropriate fret and string finger position indictor means, open string position indicator means and first fret reference indicator means.

4. A device according to claim 3 wherein each chord indicator button and corresponding chord indicator switch corresponds to a chord type selected from the following group: major, minor, diminished, augmented, suspended.

5. A device according to claim 4 wherein each chord indicator button and corresponding chord indicator switch corresponds to a different chord type selected from the group consisting of major, minor, diminished, dominant, augmented, suspended, 6, 7 and 9.

6. A device according to claim 1 further provided with LED on/off indicator means electronically associated with the device to indicate when the device is on.

7. A device according to claim 1 wherein a series of chord alternative position indicator buttons and corresponding chord alternative position indicator switches are further provided, the chord alternative position indicator switches being electronically associated with the microprocessor and being each simultaneously actuable with the chord information switches but independently and not simultaneously actuable with other chord alternative position indicator switches; the ROM means being programmed with chord table information relating to alternative chord positions for chords and desired keys with related alternative fret and string finger position, the microprocessor being also adapted to store information concerning the particular chord alternative position indicator switch actuated until the select switch is actuated, and then search the ROM for fret and string finger position information corresponding to the particular chord information switch and chord alternative position indicator switch actuated and display that information on the appropriate string and fret position indicator means, open string position indicator means and first fret reference indicator means.

8. A device according to claim 1 further provided with a tape recorder and playback means electronically associated therewith to record characteristic signals received from the microprocessor relating to a sequence of selected chords and to enable playback of those signals to the microprocessor to cause to be illustrated on the fret and finger position representation an identical sequence of chord finger positions.

* * * * *